(12) United States Patent
Harradine et al.

(10) Patent No.: US 7,526,178 B2
(45) Date of Patent: Apr. 28, 2009

(54) IDENTIFYING AND PROCESSING OF AUDIO AND/OR VIDEO MATERIAL

(75) Inventors: Vince Carl Harradine, Waterdown (CA); Alan Turner, Basingstoke (GB); Michael Williams, Basingstoke (GB); Morgan William Amos David, Farnham (GB); James Hedley Wilkinson, Tadley (GB)

(73) Assignee: Sony United Kingdom Limited, Weybridge (GB)

( * ) Notice: Subject to any disclaimer, the term of this patent is extended or adjusted under 35 U.S.C. 154(b) by 1171 days.

(21) Appl. No.: 10/008,072

(22) Filed: Dec. 4, 2001

(65) Prior Publication Data

US 2002/0146232 A1 Oct. 10, 2002

Related U.S. Application Data

(63) Continuation of application No. PCT/GB01/01461, filed on Mar. 30, 2001.

(30) Foreign Application Priority Data

Apr. 5, 2000 (GB) .................................. 0008420.2
Apr. 5, 2000 (GB) .................................. 0008440.0

(51) Int. Cl.
  *H04N 5/76* (2006.01)
  *H04N 7/00* (2006.01)
(52) U.S. Cl. .......................................... 386/46; 386/95
(58) Field of Classification Search .................... 386/1, 386/39, 95, 69, 70, 45, 46, 125, 126, 52
See application file for complete search history.

(56) References Cited

U.S. PATENT DOCUMENTS 5,541,738 A * 7/1996 Mankovitz .................... 386/83

(Continued)

FOREIGN PATENT DOCUMENTS

EP 0 580 367 1/1994

(Continued)

OTHER PUBLICATIONS

SMPTE Journal, *Proposed SMPTE Standard for Television—Unique Material Identifier (UMID)*, Mar. 2000, pp. 221-225.

(Continued)

*Primary Examiner*—Thai Tran
*Assistant Examiner*—Nigar Chowdhury
(74) *Attorney, Agent, or Firm*—Oblon, Spivak, McClelland, Maier & Neustadt, P.C.

(57) ABSTRACT

A processor (403) is provided for processing identifiers of video and/or audio material. The processor is for use with a video and/or audio material processing device. The device has a plurality of inputs (IN) for receiving respective pieces of material to be processed, the pieces having respective identifiers, and an output (OUT) at which is output processed material, which is a combination of the input material, and a state output at which data defining the state of the device is output.

The processor is arranged to: detect (405) the identifiers of the input material; determine (406) from the state data the combination of the input material forming the output material; generate (407) an identifier for the output material; and associate the identifier of the output material with the identifiers of the input material used to form the output material.

Identifiers preferably indicate whether the material emanates from a recorder or from a live source.

13 Claims, 22 Drawing Sheets

U.S. PATENT DOCUMENTS

| | | | | |
|---|---|---|---|---|
| 5,774,664 | A | * | 6/1998 | Hidary et al. ............... 725/110 |
| 5,798,800 | A | | 8/1998 | Nonaka |
| 5,910,825 | A | | 6/1999 | Takeuchi |
| 6,038,368 | A | * | 3/2000 | Boetje et al. .................. 386/52 |
| 6,278,838 | B1 | * | 8/2001 | Mendenhall et al. ........ 386/125 |
| 6,430,355 | B1 | * | 8/2002 | Nagasawa .................... 386/52 |
| 6,629,145 | B1 | * | 9/2003 | Pham et al. ................. 709/230 |
| 7,055,167 | B1 | * | 5/2006 | Masters ....................... 725/39 |

FOREIGN PATENT DOCUMENTS

| | | |
|---|---|---|
| EP | 0 726 680 | 8/1996 |
| EP | 0 757 488 | 2/1997 |
| EP | 0 801 388 | 10/1997 |
| EP | 1083567 | 3/2001 |
| EP | 1083568 | 3/2001 |
| EP | 1102271 | 5/2001 |
| GB | 2301930 | 12/1996 |
| GB | 2312078 | 10/1997 |
| GB | 2328552 | 2/1999 |
| WO | 97/39411 | 10/1997 |
| WO | 98/33325 | 7/1998 |

OTHER PUBLICATIONS

Wilkinson, J.H. et al., "*Tools and Techniques for Globally Unique Content Identification*" *International Broadcasting Convention (IBC'99)*, Sep. 10th - 14th, 1999, Amsterdam.

* cited by examiner

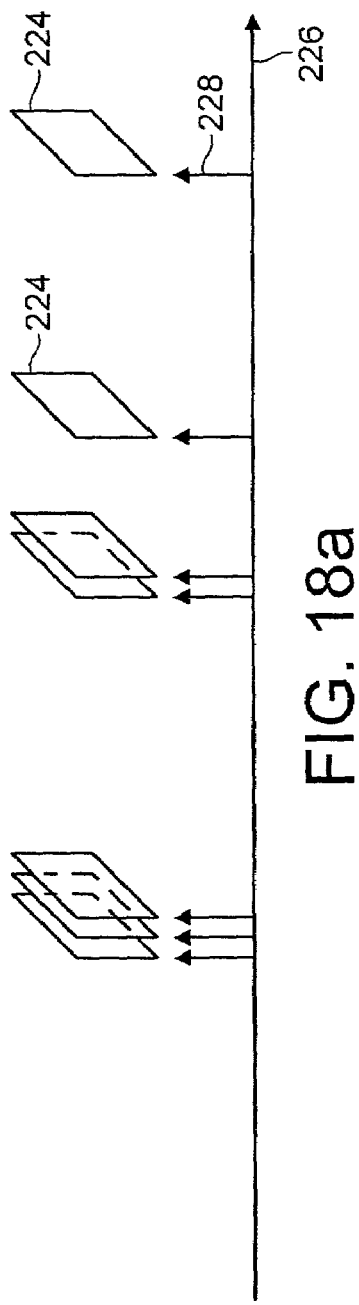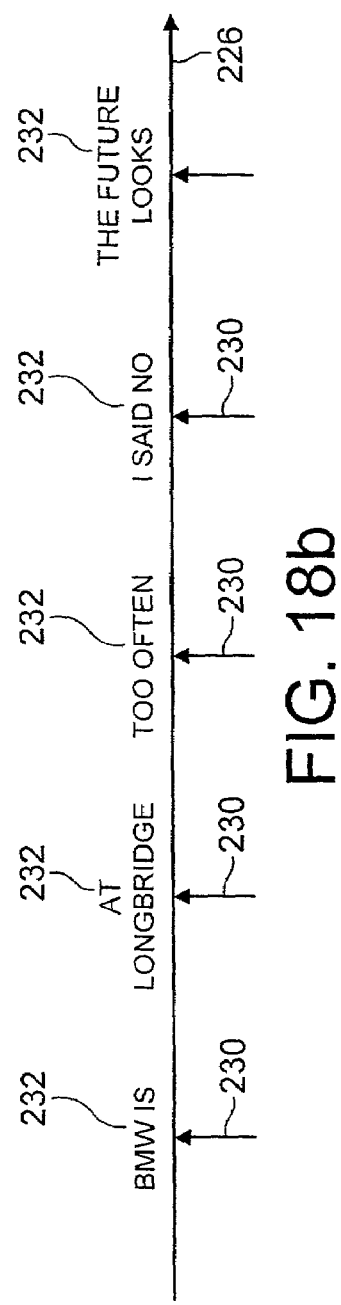

| Application | |
|---|---|
| Syntax | Horse Name = "Shergar"<br>Colour = "Brown" |
| Dictionary | DATA / VALUE<br>HORSE NAME / SHERGAR<br>COLOUR / BROWN |
| Data Coding | Data.txt<br>Horse Name= "Shergar" |
| Transfer / Storage | Destination Zip / Sender Zip<br>Data.txt — Horse Name="Shergar"    Data.txt — Horse Name="Shergar" |
| Physical | |

FIG. 19

METADATA STORED WITH CONTENT

METADATA STORED CENTRALLY (ONCE) WITH REFERENCE ON CONTENT ered pieces of material to be processed, the pieces having respective identifiers, and
IDENTIFYING AND PROCESSING OF AUDIO AND/OR VIDEO MATERIAL This is a continuation of copending International Application PCT/GB01/01461 having an international filing date of 30 Mar. 2001.

The present invention relates to processing identifiers of video and/or audio and/or data material. The present invention also relates to processing video and/or audio and/or data material which has identifiers associated with it. Material is thus represented by an information signal.

It has been proposed to associate material identifiers with video and audio material. For example universally unique identifiers have been proposed to identify material to the accuracy of possibly one frame. An example of such an identifier is a UMID. Material, for example a take or clip, is preferably identified at the time it is first created. Such an identifier allows tracking and control of the material for the purposes of copyright protection, allowing the owner to bill others who use the material and many other functions in the production and distribution of video and audio material.

It is known to process (old) material in a way that effectively creates new material. For example two or more pieces of material may be combined in an editor or special effects machine to create a new piece of material.

As another example an event may be televised live with several cameras each producing material. In addition recorded material may be used for example for opening and closing credits. The final material which is broadcast or otherwise distributed to an audience is created by selecting and combining material from various ones of the sources (cameras, recorders etc.) live.

According to one aspect of the present invention, there is provided a processor for processing identifiers of video and/or audio and/or data material, the processor being for use with a video and/or audio and/or data material processing device, the device having plurality of inputs for receiving respective pieces of material to be processed, the pieces having respective identifiers, and an output at which is output processed material, which is a combination of the input material, and a state output at which data defining the state of the device is output; the processor being arranged to: detect the identifiers of the input material; determine, from the state data, the combination of the input material forming the output material; generate an identifier for the output material; and associate the identifier of the output material with the identifiers of the input material used to form the output material.

Thus, the processor automatically detects identifiers in material input into a video and/or audio and/or data processing device, determines the identifiers of the processed material output by the processing device, associates an identifier to the output processed material and associates the identifiers of the input material with the identifier of the output material.

Some input material may not have an identifier. The processor preferably generates an identifier for such material so that it is processed in the same way as all the other material.

The identifier associated with the output material may be applied to the output material. The output identifier is stored in the database and linked to the relevant metadata in the database.

New identifiers may be generated for new sub-combinations of material which form part(s) of the final output material.

Another aspect of the invention provides a processor for processing video and/or audio material, the processor having plurality of inputs for receiving respective pieces of material to be processed, the pieces having respective identifiers, and an output at which is output processed material, which is a combination of the input material; the processor also being arranged to: detect the identifiers of the input material; determine from the state data the combination of the input material forming the output material; generate an identifier for the output material; and associate the identifier of the output material with the identifiers of the input material used to form the output material.

As discussed above it has been proposed to identify video and audio material using a material identifier. An example of such an identifier is a UMID. Some material may not have an identifier at source and one needs to be associated with the material. Some processes performed on material generate new material from old material and thus involve generating a new identifier.

Some recorded material is reproduced from the record e.g. tape or disc and recorded again, without changing the content. UMIDs have instance numbers which are used to denote different instances of the same material. For example the first record of material has instance number zero, the next recording of the same material has instance number one. The identifier is otherwise unchanged.

Material from a live source such as a camera or microphone also undergoes change of form without being recorded e.g. analogue to digital, digital to compressed digital, without changing the content of the material.

According to a further aspect of the present invention, there is provided a video and/or audio signal processing system in which video and/or audio material represented by a video and/or audio signal and emanating from a source is associated with a material identifier having a data field identifying the type of source.

Thus the type of source, e.g. whether the source is a live source such as a camera or microphone, or a source of recorded material, is indicated. Material which is streamed from a live source but not recorded has for example instance numbers allocated to it, which instance numbers are denoted by a type indicator as being instances of streamed and unrecorded data. Material from recorded sources has instance numbers allocated to it but which have a different type indicator to streamed instance numbers.

For streamed material the identifier, e.g. the UMID, is embedded in the data stream. For instance it is in the Vertical blanking interval. Some processes in the processing chain such as encoding and decoding pass the vertical blanking interval unchanged or do not provide for processing it giving a potentially false instance number. Thus in accordance with an embodiment of the invention, such an identifier is denoted by the type indicator as applying only to recorded instances.

For a better understanding of the present invention, reference will now be made, by way of example, to the accompanying drawings in which:

FIGS. 13 to 18 illustrate a B-Box;

FIGS. 19 to 21 illustrate metadata;

The following description refers to the following:

Overview—which is described with reference to FIGS. 1 and 2;

UMIDs—which are described with reference to FIGS. 3 and 4;

Metadata—which are described with reference to FIG. 5, and also FIG. 19 to 21;

A Box—which is described with reference to FIGS. 6 to 12; and

B Box—which is described with reference to FIGS. 13 to 18.

Modified UMID—which is described with reference to FIGS. 22 and 23.

Figure 1:
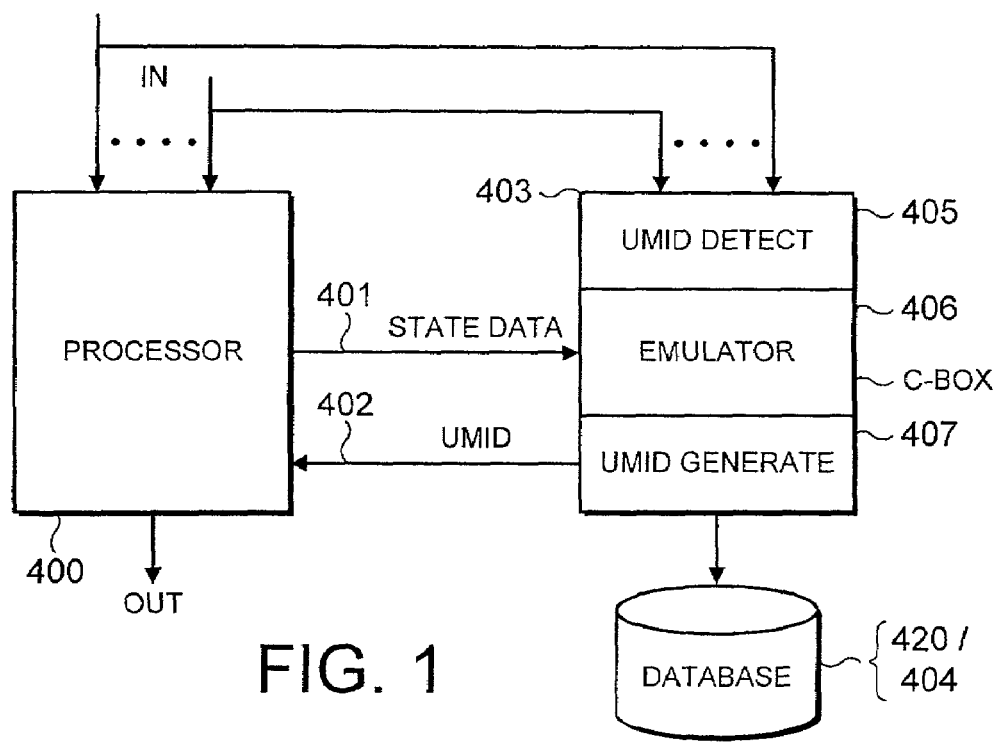
FIG. 1 is a schematic block diagram of a video and/or audio signal processor coupled to a material identifier processor according to an embodiment of one aspect of the invention.
Figure 2:
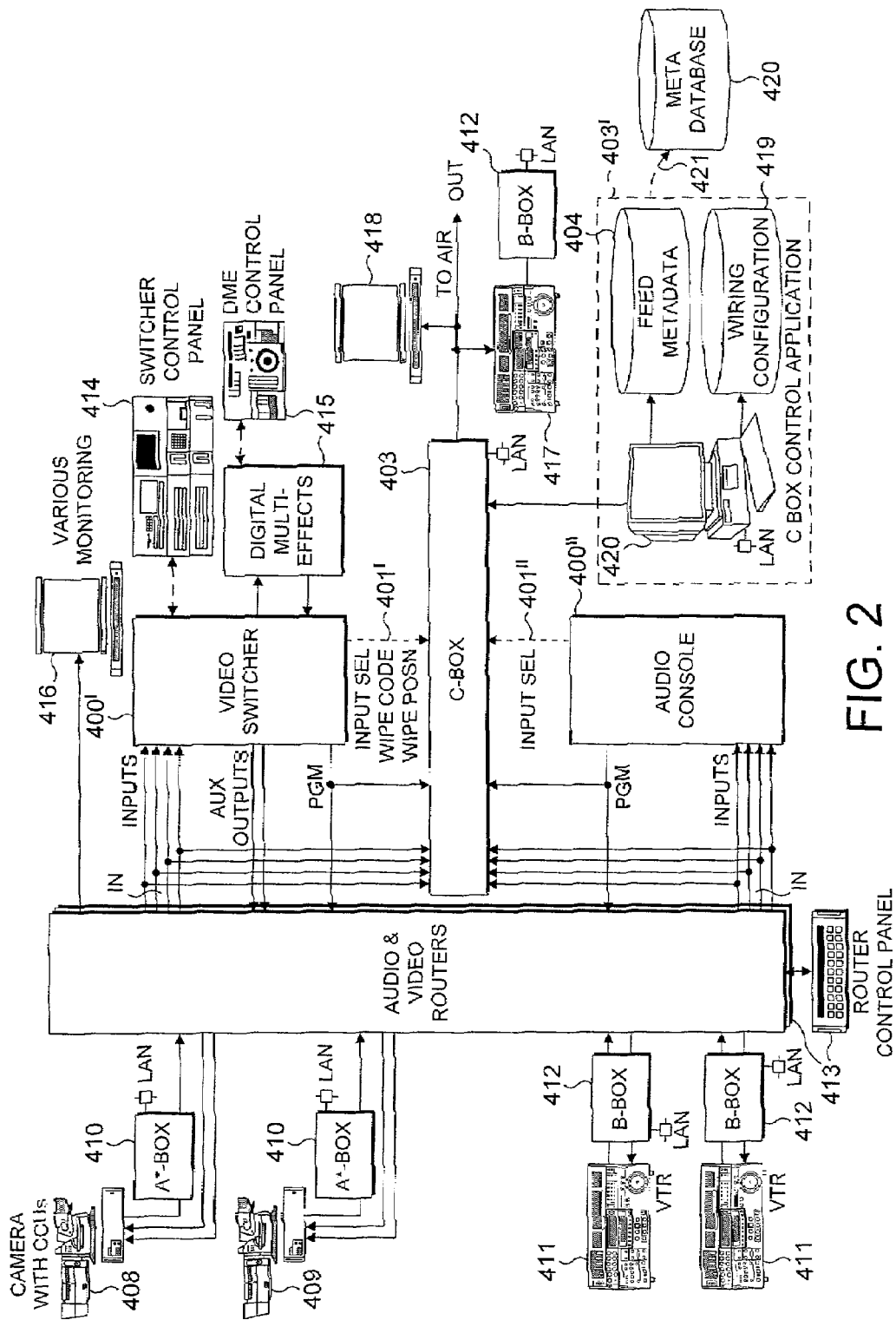
FIG. 2 is a schematic block diagram of a video and audio production system.

Overview—FIGS. 1 and 2.

Referring to FIG. 1, a video and/or audio signal processor 400 has a plurality of inputs IN. For convenience of description, reference will be made in the following discussion only to video but it is to be appreciated that the principles of the invention may be applied to audio or to data. The processor may be a video switcher, a mixer, a special effects machine or any other processor. For ease of explanation, the following discussion refers to a mixer. The inputs IN of the mixer receive video material having UMIDs which are material identifiers and are described in the section UMIDs below. The mixer 400 combines material from selected ones of the inputs in known manner. At the output OUT of the mixer, there is produced material which comprises: a sequence of material selected from various ones of the inputs and sequentially combined as by cutting and inserting; and/or material from two or more inputs which are non-sequentially combined such as one piece of material being inserted into frames of the other such as Picture-in-Picture; and/or other combinations known in the art. The processor 400 has a state data output 401. Such an output is provided on some known processors. It provides data indicating the manner in which signals are being combined and from which inputs they emanate for example.

Consider a simple example as follows. Inputs IN receive respective video inputs identified as a, b, c, d, e and f. Inputs a, b, c and d emanate from live sources. Input e originates from a VTR and input f is a feed from another production company. Inputs a and b are combined so that b appears as a picture-in-picture in a. Inputs c and d are mixed with a dissolve at their junction so part of the result comprises both c and d.

Assume video items on inputs a to e are identified by UMIDs a to e, UMIDs a to e being embedded in the respective video signals a to e, and input f has no UMID.

The final output comprises a combination of a to f.

Rules are applied to give the final output a new UMID and to give UMIDs to sub-combinations which are effectively new material. (The rules to be applied may be a matter of business policy and/or a matter to be agreed by standardisation organisations). It is desirable for many reasons to create an audit trail of the UMIDs and their relationships. The reasons include copyright protection and the payment of royalties, amongst others.

In accordance with an embodiment of the invention, a UMID processor 403, herein referred to as a "C-Box", is provided. The C-Box 403 creates the audit trail and applies the UMID application rules to the material processed by the video processor 400. The C-Box 403 may be implemented using a programmed computer with suitable interfaces.

The C-Box 403 has inputs connected to respective inputs IN of the video processor 400. The C-Box has means which detects the UMIDs of e.g. input signals such as UMIDs a to e of inputs a to e. Input f has no UMID so the C-Box applies a UMID f to it so that it can be processed in exactly the same way as the other inputs. The C-Box has an emulator which receives the state data of the video processor via a connection 401 to mimic the actions thereof. The C-Box creates and applies the UMID application rules appropriate to the combinations of material produced by the video processor. The C-Box has means which applies any new UMIDs to the processed video via a connection 402. The C-box thereby creates the audit trail.

The C-Box transfers the audit trail to a database 404/420 which may also store other metadata related by the UMIDs to the material processed by the video processor 400. Alternatively or additionally, the C-Box may insert the audit trail and optionally some metadata into the video signal, for instance into the vertical blanking interval.

Whilst the C-Box is shown as an addition to the video processor, it may be integral therewith.

Whilst FIG. 1 shows the final video output is from the video processor, the final video output is preferably via the C-Box which applies the UMID to the final combination of input material. The final combination of material broadcast to air may be allocated a Unique Programme Identifier (UPID) which universally uniquely identifies the full combination of material forming the programme. The C-Box may remove all UMIDs and the UPID from material sent for broadcast as described below.

FIG. 2 is a schematic diagram of an illustrative video and audio production system. FIG. 2 illustrates the production of a programme which is broadcast to air and is formed of live material from cameras 408 and 409, recorded material from VTRs 411 and involves material processed by a Digital Multi Effects machine 415. The programme material is assembled live from the various sources 408, 409, 411 and 415 by a router 413, a video switcher 400' which has a control panel 414 and an audio console 400". A Monitor 416 is provided for monitoring various operations. A monitor 418 monitors, and a VTR 417 records, the programme broadcast to air. The VTR 417 may also have a B-Box 412 coupled to it and connecting it to the LAN. The B-Box may communicate to the metadata base 404, a Tape ID of, and/or UMIDs of material on the tape in the VTR 417 and/or other metadata. Thus the tape and its contents can be identified in the database.

The cameras have A-Boxes 410 and the VTRs 411 have B-Boxes 412. A C-Box is associated with the video switcher 400' and audio console 400". It has state data inputs 401' and 401" for receiving state data from the video switcher 400" and audio console 400". In this example, the final programme is fed to air from the C-Box. The C-Box 403 has a Control Application 403' comprising a computer 420, a feed metadata base 404 and a state database 419. The feed metadata base takes the audit trail and other metadata and feeds it to a main database 420 via a communication link indicated by a dashed line 421.

The cameras 408 and 409 produce live video which is streamed to the router 413. UMIDs are embedded in the video streams. The UMIDs are produced by the A-Boxes 410. The A-Boxes may also produce and/or gather metadata which is fed by, for example, a LAN to the metadata base 404 with the associated UMIDs. VTRs 411 reproduce recorded video which has UMIDs. The UMIDs are reproduced on playback and are in this example embedded in the video sent to the router 413. Metadata may be recorded on the tape and also reproduced. The B-Boxes may be connected to the LAN. The B-Boxes may transfer UMIDs of reproduced material together with any available metadata to the metadata base 404 via the LAN. If the recorded material has no UMIDs they may be applied by the B-Boxes 412.

The C box 403 detects the states of the audio console and the video switcher via the state data inputs 401' and 401" and emulates their states to create the audit trail of UMIDs. It also associates the final UMID and/or the UPID to the programme sent to air.

The C-Box may remove from the material all the UMIDs so the programme sent to air has no UMIDs and no UPID. In that case the final UMID and/or UPID are stored only in the metadata base 404 together with the metadata relating to the programme. If, for example, the final programme is fed to a recorder for storage and is not intended for immediate broadcast the UMIDs and UPID may be retained in the material.

The C-Box 403 detects the UMIDs and transfers them to the metadata base 404. The metadata base 403 contains metadata which may be as described with reference to FIG. 5 and/or which may be as described with reference to FIGS. 19 to 22. The metadata may be accessible by users of the material. For example the metadata or preferably a selection of it may be inserted into the broadcast material as teletext information or the like. The metadata may be accessible to users via the LAN or by internet connection or other communication link.

Rules for Applying and Varying UMIDs and UPIDs.

The Tables 1 to 4 at the end of this description indicate some possible policies or rules for assigning UMIDs, and/or varying UMIDs by instance number I# and material number M# and label L#. In these Tables A=Audio, V=Video. In row 6 of table 3, A' and B' indicate video material items, and NLE means Non Linear Editing. FX means 'effects'. VBI means Vertical Blanking Interval. SD means Standard Definition. HD means High Definition. As the Tables show, the audit trail performed by the C-Box needs to track variants of UMIDs.

Figure 3:
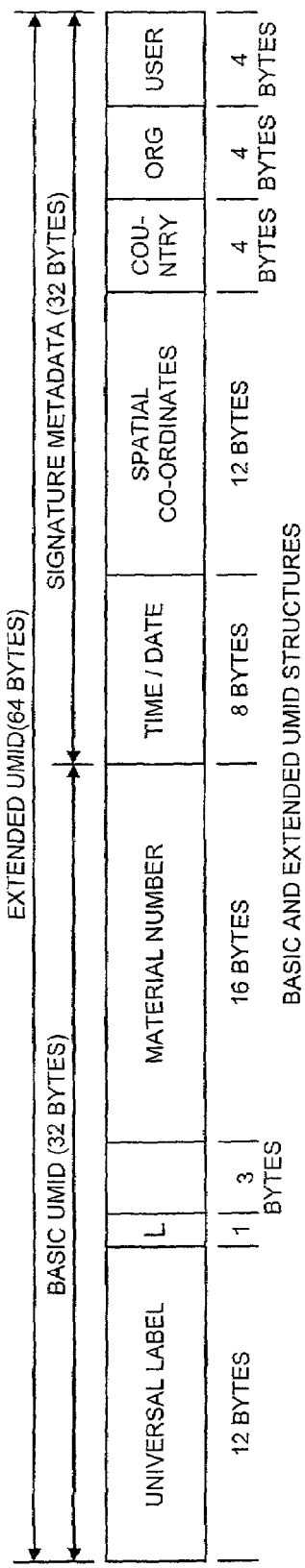
FIGS. 3 and 4 illustrate UMIDs.
Figure 4:

UMIDs—FIGS. 3 and 4

UMIDs

A UMID is described for example SMPTE Journal March 2000. Referring to FIG. 3, an extended UMID is shown. It comprises a first set of 32 bytes of basic UMID and a second set of 32 bytes of signature metadata.

The first set of 32 bytes is the basic UMID. The components are:

A 12-byte Universal Label to identify this as a SMPTE UMID. It defines the type of material which the UMID identifies and also defines the methods by which the globally unique Material and locally unique Instance numbers are created.

A 1-byte length value to define the length of the remaining part of the UMID.

A 3-byte Instance number which is used to distinguish between different 'instances' of material with the same Material number.

A 16-byte Material number which is used to identify each clip. Each Material number is the same for related instances of the same material.

The second set of 32 bytes of the signature metadata as a set of packed metadata items used to create an extended UMID. The extended UMID comprises the basic UMID followed immediately by signature metadata which comprises:

An 8-byte time/date code identifying the time and date of the Content Unit creation.

A 12-byte value which defines the spatial co-ordinates at the time of Content Unit creation.

3 groups of 4-byte codes which register the country, organisation and user codes.

Each component of the basic and extended UMIDs will now be defined in turn.

The 12-Byte Universal Label

The first 12 bytes of the UMID provide identification of the UMID by the registered string value defined in table 1.

TABLE 1

Specification of the UMID Universal Label

| Byte No. | Description | Value (hex) |
|---|---|---|
| 1 | Object Identifier | 06h |
| 2 | Label size | 0Ch |
| 3 | Designation: ISO | 2Bh |
| 4 | Designation: SMPTE | 34h |
| 5 | Registry: Dictionaries | 01h |
| 6 | Registry: Metadata Dictionaries | 01h |
| 7 | Standard: Dictionary Number | 01h |
| 8 | Version number | 01h |
| 9 | Class: Identification and location | 01h |
| 10 | Sub-class: Globally Unique Identifiers | 01h |
| 11 | Type: UMID (Picture, Audio, Data, Group) | 01, 02, 03, 04h |
| 12 | Type: Number creation method | XXh |

The hex values in table 1 may be changed: the values given are examples. Also the bytes 1-12 may have designations other than those shown by way of example in the table. Referring to the Table 1, in the example shown byte 4 indicates that bytes 5-12 relate to a data format agreed by SMPTE. Byte 5 indicates that bytes 6 to 10 relate to "dictionary" data. Byte 6 indicates that such data is "metadata" defined by bytes 7 to 10. Byte 7 indicates the part of the dictionary containing metadata defined by bytes 9 and 10. Byte 10 indicates the version of the dictionary. Byte 9 indicates the class of data and Byte 10 indicates a particular item in the class.

In the present embodiment bytes 1 to 10 have fixed preassigned values. Byte 11 is variable. Thus referring to FIG. 4, and to Table 1 above, it will be noted that the bytes 1 to 10 of the label of the UMID are fixed. Therefore they may be replaced by a 1 byte 'Type' code T representing the bytes 1 to 10. The type code T is followed by a length code L. That is followed by 2 bytes, one of which is byte 11 of Table 1 and the other of which is byte 12 of Table 1, an instance number (3 bytes) and a material number (16 bytes). Optionally the material number may be followed by the signature metadata of the extended UMID and/or other metadata.

The UMID type (byte 11) has 4 separate values to identify each of 4 different data types as follows:

'01h'=UMID for Picture material
'02h'=UMID for Audio material
'03h'=UMID for Data material
'04h'=UMID for Group material (i.e. a combination of related essence).

The last (12th) byte of the 12 byte label identifies the methods by which the material and instance numbers are created. This byte is divided into top and bottom nibbles where the top nibble defines the method of Material number creation and the bottom nibble defines the method of Instance number creation.

Length

The Length is a 1-byte number with the value '13h' for basic UMIDs and '33h' for extended UMIDs.

Instance Number

The Instance number is a unique 3-byte number which is created by one of several means defined by the standard. It provides the link between a particular 'instance' of a clip and externally associated metadata. Without this instance number, all material could be linked to any instance of the material and its associated metadata.

The creation of a new clip requires the creation of a new Material number together with a zero Instance number.

Therefore, a non-zero Instance number indicates that the associated clip is not the source material. An Instance number is primarily used to identify associated metadata related to any particular instance of a clip.

Material Number

The 16-byte Material number is a non-zero number created by one of several means identified in the standard. The number is dependent on a 6-byte registered port ID number, time and a random number generator.

Signature Metadata

Any component from the signature metadata may be null-filled where no meaningful value can be entered. Any null-filled component is wholly null-filled to clearly indicate a downstream decoder that the component is not valid.

The Time-Date Format

The date-time format is 8 bytes where the first 4 bytes are a UTC (Universal Time Code) based time component. The time is defined either by an AES3 32-bit audio sample clock or SMPTE 12M depending on the essence type.

The second 4 bytes define the date based on the Modified Julian Data (MJD) as defined in SMPTE 309M. This counts up to 999,999 days after midnight on the 17th November 1858 and allows dates to the year 4597.

The Spatial Co-ordinate Format

The spatial co-ordinate value consists of three components defined as follows:

Altitude: 8 decimal numbers specifying up to 99,999,999 meters.

Longitude: 8 decimal numbers specifying East/West 180.00000 degrees (5 decimal places active).

Latitude: 8 decimal numbers specifying North/South 90.00000 degrees (5 decimal places active).

The Altitude value is expressed as a value in meters from the centre of the earth thus allowing altitudes below the sea level.

It should be noted that although spatial co-ordinates are static for most clips, this is not true for all cases. Material captured from a moving source such as a camera mounted on a vehicle may show changing spatial co-ordinate values.

Country Code

The Country code is an abbreviated 4-byte alpha-numeric string according to the set defined in ISO 3166. Countries which are not registered can obtain a registered alpha-numeric string from the SMPTE Registration Authority.

Organisation Code

The Organisation code is an abbreviated 4-byte alpha-numeric string registered with SMPTE. Organisation codes have meaning only in relation to their registered Country code so that Organisation codes can have the same value in different countries.

User Code

The User code is a 4-byte alpha-numeric string assigned locally by each organisation and is not globally registered. User codes are defined in relation to their registered Organisation and Country codes so that User codes may have the same value in different organisations and countries.

Freelance Operators

Freelance operators may use their country of domicile for the country code and use the Organisation and User codes concatenated to e.g. an 8 byte code which can be registered with SMPTE. These freelance codes may start with the '~' symbol (ISO 8859 character number 7Eh) and followed by a registered 7 digit alphanumeric string.

Figure 5:
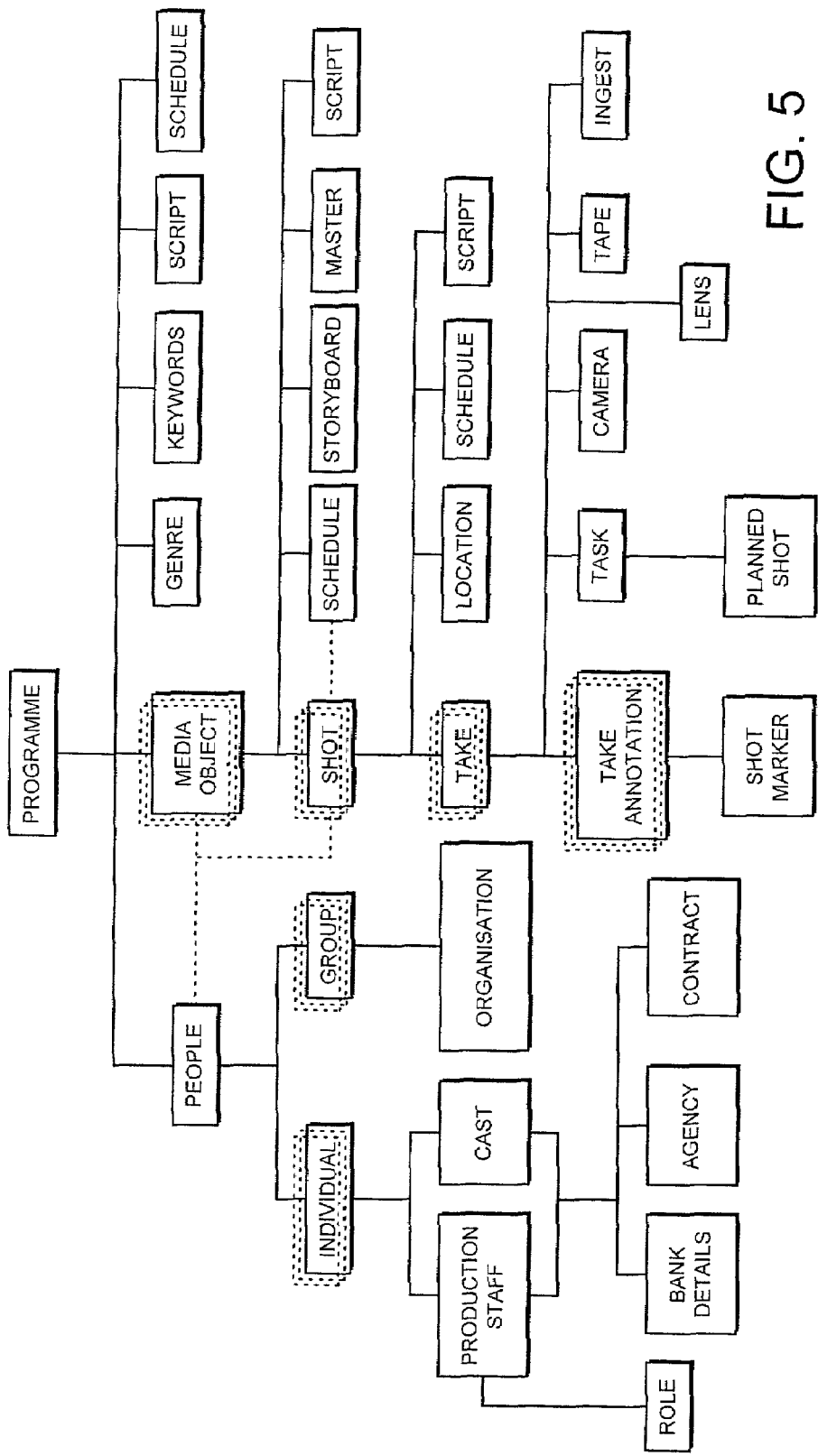
FIG. 5 illustrates an example of a data structure of metadata in a database.

Metadata—FIG. 5

The following is provided, by way of example, to illustrate the possible types of metadata generated during the production of a programme, and one possible organisational approach to structuring that metadata in a metadata base. UMIDs provide a link between the video and/or audio material and the metadata stored in the metadata base.

FIG. 5 illustrates an example structure for organising metadata. A number of tables each comprising a number of fields containing metadata are provided. The tables may be associated with each other by way of common fields within the respective tables, thereby providing a relational structure. Also, the structure may comprise a number of instances of the same table to represent multiple instances of the object that the table may represent. The fields may be formatted in a predetermined manner. The size of the fields may also be predetermined. Example sizes include "Int" which represents 2 bytes, "Long Int" which represents 4 bytes and "Double" which represents 8 bytes. Alternatively, the size of the fields may be defined with reference to the number of characters to be held within the field such as, for example, 8, 10, 16, 32, 128, and 255 characters.

Turning to the structure in more detail, there is provided a Programme Table. The Programme Table comprises a number of fields including Programme ID (PID), Title, Working Title, Genre ID, Synopsis, Aspect Ratio, Director ID and Picturestamp. Associated with the Programme Table is a Genre Table, a Keywords Table, a Script Table, a People Table, a Schedule Table and a plurality of Media Object Tables.

The Genre Table comprises a number of fields including Genre ID, which is associated with the Genre ID field of the Programme Table, and Genre Description.

The Keywords Table comprises a number of fields including Programme ID, which is associated with the Programme ID field of the Programme Table, Keyword ID and Keyword.

The Script Table comprises a number of fields including Script ID, Script Name, Script Type, Document Format, Path, Creation Date, Original Author, Version, Last Modified, Modified By, PID associated with Programme ID and Notes. The People Table comprises a number of fields including Image.

The People Table is associated with a number of Individual Tables and a number of Group Tables. Each Individual Table comprises a number of fields including Image. Each Group Table comprises a number of fields including Image. Each Individual Table is associated with either a Production Staff Table or a Cast Table.

The Production Staff Table comprises a number of fields including Production Staff ID, Surname, Firstname, Contract ID, Agent, Agency ID, E-mail, Address, Phone Number, Role ID, Notes, Allergies, DOB, National Insurance Number and Bank ID and Picture Stamp.

The Cast Table comprises a number of fields including Cast ID, Surname, Firstname, Character Name, Contract ID, Agent, Agency ID, Equity Number, E-mail, Address, Phone Number, DOB and Bank ID and Picture Stamp. Associated with the Production Staff Table and Cast Table are a Bank Details Table and an Agency Table.

The Bank Details Table comprises a number of fields including Bank ID, which is associated with the Bank ID field of the Production Staff Table and the Bank ID field of the Cast Table, Sort Code, Account Number and Account Name.

The Agency Table comprises a number of fields including Agency ID, which is associated with the Agency ID field of the Production Staff Table and the Agency ID field of the Cast Table, Name, Address, Phone Number, Web Site and E-mail and a Picture Stamp. Also associated with the Production Staff Table is a Role Table.

The Role Table comprises a number of fields including Role ID, which is associated with the Role ID field of the Production Staff Table, Function and Notes and a Picture Stamp. Each Group Table is associated with an Organisation Table.

The Organisation Table comprises a number fields including Organisation ID, Name, Type, Address, Contract ID, Contact Name, Contact Phone Number and Web Site and a Picture Stamp.

Each Media Object Table comprises a number of fields including Media Object ID, Name, Description, Picturestamp, PID, Format, schedule ID, script ID and Master ID. Associated with each Media Object Table is the People Table, a Master Table, a Schedule Table, a Storyboard Table, a script table and a number of Shot Tables.

The Master Table comprises a number of fields including Master ID, which is associated with the Master ID field of the Media Object Table, Title, Basic UMID, EDL ID, Tape ID and Duration and a Picture Stamp.

The Schedule Table comprises a number of fields including Schedule ID, Schedule Name, Document Format, Path, Creation Date, Original Author, Start Date, End Date, Version, Last Modified, Modified By and Notes and PID which is associated with the programme ID.

The contract table contains: a contract ID which is associated with the contract ID of the Production staff, cast, and organisation tables; commencement date, rate, job title, expiry date and details.

The Storyboard Table comprises a number of fields including Storyboard ID, which is associated with the Storyboard ID of the shot Table, Description, Author, Path and Media ID.

Each Shot Table comprises a number of fields including Shot ID, PID, Media ID, Title, Location ID, Notes, Picturestamp, script ID, schedule ID, and description. Associated with each Shot Table is the People Table, the Schedule Table, script table, a Location Table and a number of Take Tables.

The Location Table comprises a number of fields including Location ID, which is associated with the Location ID field of the Shot Table, GPS, Address, Description, Name, Cost Per Hour, Directions, Contact Name, Contact Address and Contact Phone Number and a Picture Stamp.

Each Take Table comprises a number of fields including Basic UMID, Take Number, Shot ID, Media ID, Timecode IN, Timecode OUT, Sign Metadata, Tape ID, Camera ID, Head Hours, Videographer, IN Stamp, OUT Stamp. Lens ID, AUTOID ingest ID and Notes. Associated with each Take Table is a Tape Table, a Task Table, a Camera Table, a lens table, an ingest table and a number of Take Annotation Tables.

The Ingest table contains an Ingest ID which is associated with the Ingest Id in the take table and a description.

The Tape Table comprises a number of fields including Tape ID, which is associated with the Tape ID field of the Take Table, PID, Format, Max Duration, First Usage, Max Erasures, Current Erasure, ETA (estimated time of arrival) and Last Erasure Date and a Picture Stamp.

The Task Table comprises a number of fields including Task ID, PID, Media ID, Shot ID, which are associated with the Media ID and Shot ID fields respectively of the Take Table, Title, Task Notes, Distribution List and CC List. Associated with the Task Table is a Planned Shot Table.

The Planned Shot Table comprises a number of fields including Planned Shot ID, PID, Media ID, Shot ID, which are associated with the PID, Media ID and Shot ID respectively of the Task Table, Director, Shot Title, Location, Notes, Description, Videographer, Due date, Programme title, media title Aspect Ratio and Format.

The Camera Table comprises a number of fields including Camera ID, which is associated with the Camera ID field of the Take Table, Manufacturer, Model, Format, Serial Number, Head Hours, Lens ID, Notes, Contact Name, Contact Address and Contact Phone Number and a Picture Stamp.

The Lens Table comprises a number of fields including Lens ID, which is associated with the Lens ID field of the Take Table, Manufacturer, Model, Serial Number, Contact Name, Contact Address and Contact Phone Number and a Picture Stamp.

Each Take Annotation Table comprises a number of fields including Take Annotation ID, Basic UMID, Timecode, Shutter Speed, Iris, Zoom, Gamma, Shot Marker ID, Filter Wheel, Detail and Gain. Associated with each Take Annotation Table is a Shot Marker Table.

The Shot Marker Table comprises a number of fields including Shot Marker ID, which is associated with the Shot Marker ID of the Take Annotation Table, and Description.

A Box—FIGS. 6 to 12

Acquisition Unit

As described above, embodiments of the present invention use audio and/or video generation apparatus which may be for example television cameras, video cameras or camcorders e.g. 408, 409 in FIG. 2 which are associated with A-Boxes 410. An embodiment of the a camera and A-Box will now be described with reference to FIG. 6 which provides a schematic block diagram of a video camera which is arranged to communicate to a personal digital assistant (PDA). A PDA is an example of a data processor which may be arranged in operation to generate metadata in accordance with a user's requirements. The term personal digital assistant is known to those acquainted with the technical field of consumer electronics as a portable or hand held personal organiser or data processor which include an alpha numeric key pad and a hand writing interface.

Figure 6:
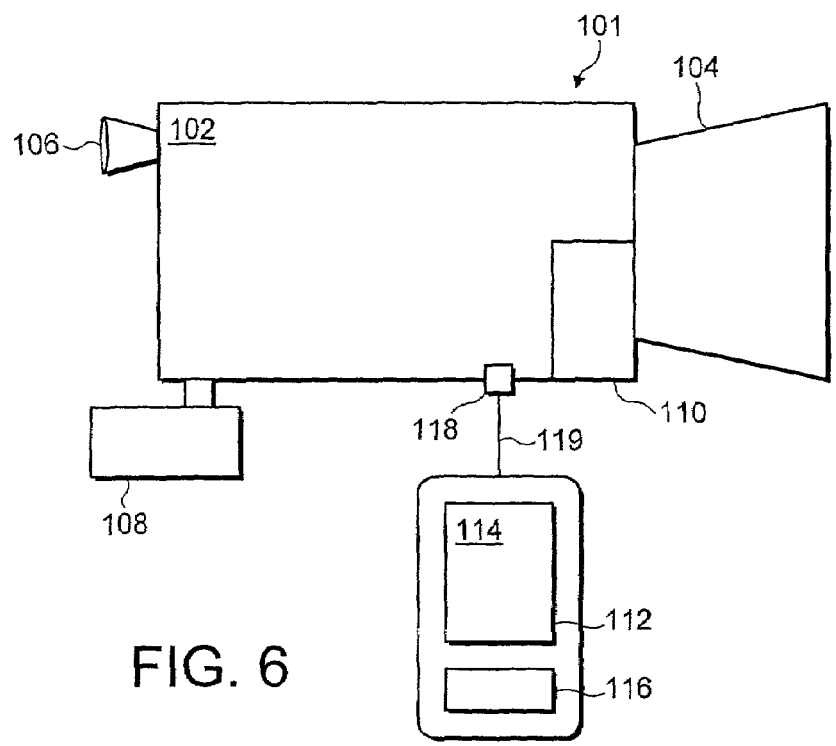
FIGS. 6 to 12 illustrate an A-Box.

In FIG. 6 a video camera 101 is shown to comprise a camera body 102 which is arranged to receive light from an image source falling within a field of view of an imaging arrangement 104 which may include one or more imaging lenses (not shown). The camera also includes a view finder 106 and an operating control unit 108 from which a user can control the recording of signals representative of the images formed within the field of view of the camera. The camera 101 also includes a microphone 110 which may be a plurality of microphones arranged to record sound in stereo. Also shown in FIG. 6 is a hand-held PDA 112 which has a screen 114 and an alphanumeric key pad 116 which also includes a portion to allow the user to write characters recognised by the PDA. The PDA 112 is arranged to be connected to the video camera 101 via an interface 118. The interface 118 is arranged in accordance with a predetermined standard format such as, for example an RS232 or the like. The interface 118 may also be effected using infra-red signals, whereby the interface 118 is a wireless communications link. The interface 118 provides a facility for communicating information with the video camera 101. The function and purpose of the PDA 112 will be explained in more detail shortly. However in general the PDA 112 provides a facility for sending and receiving metadata generated using the PDA 112 and which can be recorded with the audio and video signals detected and captured by the video camera 1. A better understanding of the operation of the video camera 101 in combination with the PDA 112 may be gathered from FIG. 7 which shows a more detailed representation of the body 102 of the video camera which is shown in FIG. 6 and in which common parts have the same numerical designations.

Figure 7:
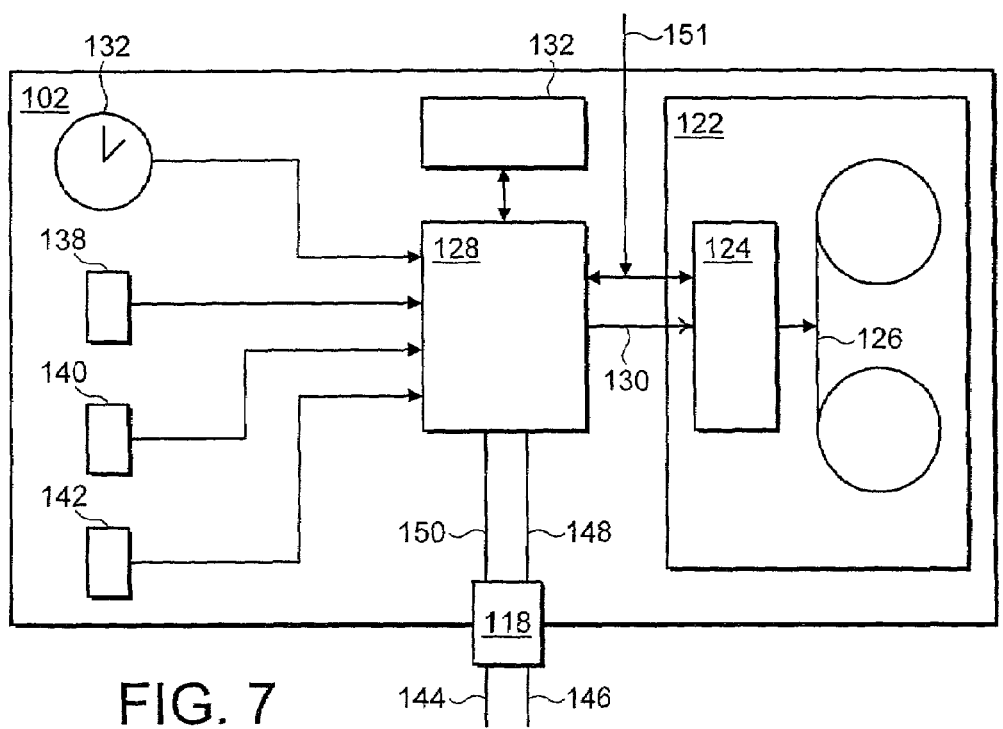

In FIG. 7 the camera body 102 is shown to comprise a tape drive 122 having read/write heads 124 operatively associated with a magnetic recording tape 126. Also shown in FIG. 7 the camera body includes a metadata generation processor 128 coupled to the tape drive 122 via a connecting channel 130. Also connected to the metadata generation processor 128 is a data store 132, a clock 136 and three sensors 138, 140, 142. The interface unit 118 sends and receives data also shown in FIG. 7 via a wireless channel 119. Correspondingly two connecting channels for receiving and transmitting data respectively, connect the interface unit 118 to the metadata generation processor 128 via corresponding connecting channels 148 and 150. The metadata generation processor is also shown to receive via a connecting channel 151 the audio/video signals generated by the camera. The audio/video signals are also fed to the tape drive 122 to be recorded on to the tape 126.

The video camera 110 shown in FIG. 6 operates to record visual information falling within the field of view of the lens arrangement 104 onto a recording medium. The visual information is converted by the camera into video signals. In combination, the visual images are recorded as video signals with accompanying sound which is detected by the microphone 101 and arranged to be recorded as audio signals on the recording medium with the video signals. As shown in FIG. 6, the recording medium is a magnetic tape 126 which is arranged to record the audio and video signals onto the recording tape 126 by the read/write heads 124. The arrangement by which the video signals and the audio signals are recorded by the read/write heads 124 onto the magnetic tape 126 is not shown in FIG. 7 and will not be further described as this does not provide any greater illustration of the example embodiment of the present invention. However once a user has captured visual images and recorded these images using the magnetic tape 126 as with the accompanying audio signals, metadata describing the content of the audio/video signals may be input using the PDA 112. As will be explained shortly this metadata can be information that identifies the audio/video signals in association with a pre-planned event, such as a 'take'. As shown in FIG. 7 the interface unit 118 provides a facility whereby the metadata added by the user using the PDA 112 may be received within the camera body 102. Data signals may be received via the wireless channel 119 at the interface unit 118. The interface unit 118 serves to convert these signals into a form in which they can be processed by the acquisition processor 128 which receives these data signals via the connecting channels 148, 150.

Metadata is generated automatically by the metadata generation processor 128 in association with the audio/video signals which are received via the connecting channel 151. In the example embodiment illustrated in FIG. 7, the metadata generation processor 128 operates to generate time codes with reference to the clock 136, and to write these time codes on to the tape 126 in a linear recording track provided for this purpose. The time codes are formed by the metadata generation processor 128 from the clock 136. Furthermore, the metadata generation processor 128 forms other metadata automatically such as a UMID, which identifies uniquely the audio/video signals. The metadata generation processor may operate in combination with the tape driver 124, to write the UMID on to the tape with the audio/video signals.

In an alternative embodiment, the UMID, as well as other metadata may be stored in the data store 132 and communicated separately from the tape 126. In this case, a tape ID is generated by the metadata generation processor 128 and written on to the tape 126, to identify the tape 126 from other tapes.

In order to generate the UMID, and other metadata identifying the contents of the audio/video signals, the metadata generation processor 128 is arranged in operation to receive signals from other sensor 138, 140, 142, as well as the clock 136. The metadata generation processor therefore operates to co-ordinate these signals and provides the metadata generation processor with metadata such as the aperture setting of the camera lens 104, the shutter speed and a signal received via the control unit 108 to indicate that the visual images captured are a "good shot". These signals and data are generated by the sensors 138, 140, 142 and received at the metadata generation processor 128. The metadata generation processor in the example embodiment is arranged to produce syntactic metadata which provides operating parameters which are used by the camera in generating the video signals. Furthermore the metadata generation processor 128 monitors the status of the camcorder 101, and in particular whether audio/video signals are being recorded by the tape drive 124. When RECORD START is detected the IN POINT time code is captured and a UMID is generated in correspondence with the IN POINT time code. Furthermore in some embodiments an extended UMID is generated, in which case the metadata generation processor is arranged to receive spatial co-ordinates which are representative of the location at which the audio/video signals are acquired. The spatial co-ordinates may be generated by a receiver which operates in accordance with the Global Positioning System (GPS). The receiver may be external to the camera, or may be embodied within the camera body 102.

When RECORD START is detected, the OUT POINT time code is captured by the metadata generation processor 128. As explained above, it is possible to generate a "good shot" marker. The "good shot" marker is generated during the recording process, and detected by the metadata generation processor. The "good shot" marker is then either stored on the tape, or within the data store 132, with the corresponding IN POINT and OUT POINT time codes.

As already indicated above, the PDA 112 is used to facilitate identification of the audio/video material generated by the camera. To this end, the PDA is arranged to associate this audio/video material with pre-planned events such as scenes, shots or takes. The camera and PDA shown in FIGS. 6 and 7 form part of an integrated system for planning, acquiring, editing an audio/video production. During a planning phase, the scenes which are required in order to produce an audio/video production are identified. Furthermore for each scene a number of shots are identified which are required in order to establish the scene. Within each shot, a number of takes may be generated and from these takes a selected number may be used to form the shot for the final edit. The planning information in this form is therefore identified at a planning stage. Data representing or identifying each of the planned scenes and shots is therefore loaded into the PDA 112 along with notes which will assist the director when the audio/video material is captured. An example of such data is shown in the table below.

| A/V Production | News story: BMW disposes of Rover |
|---|---|
| Scene ID: 900015689 | Outside Longbridge |
| Shot 5000000199 | Longbridge BMW Sign |
| Shot 5000000200 | Workers Leaving shift |
| Shot 5000000201 | Workers in car park |
| Scene ID: 900015690 | BMW HQ Munich |
| Shot 5000000202 | Press conference |
| Shot 5000000203 | Outside BMW building |
| Scene ID: 900015691 | Interview with minister |
| Shot 5000000204 | Interview |

Figure 8:
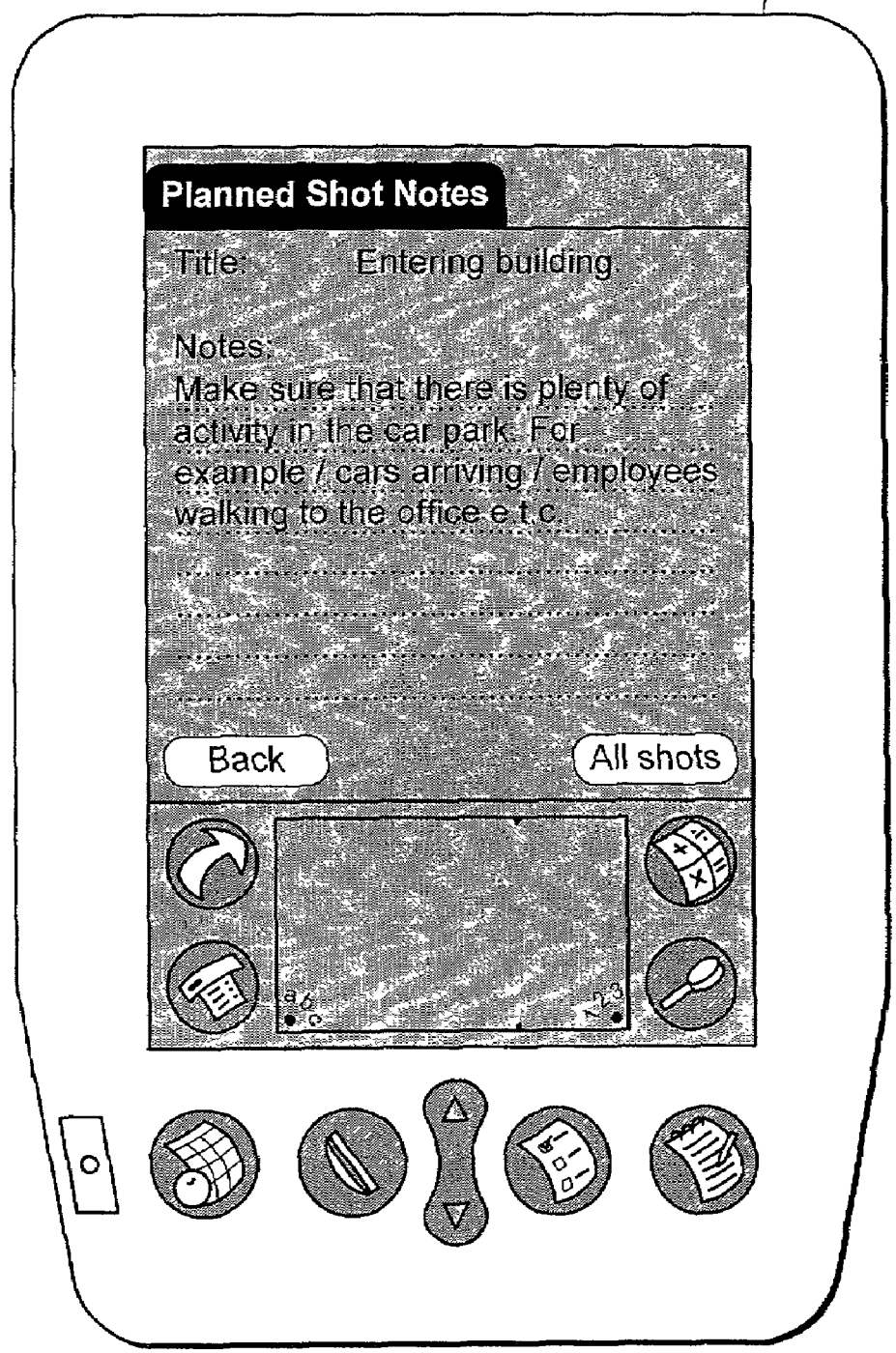

In the first column of the table below the event which will be captured by the camera and for which audio/video material will be generated is shown. Each of the events which is defined in a hierarchy is provided with an identification number. Correspondingly, in the second column notes are provided in order to direct or remind the director of the content of the planned shot or scene. For example, in the first row the audio/video production is identified as being a news story, reporting the disposal of Rover by BMW. In the extract of the planning information shown in the table below, there are three scenes, each of which is provided with a unique identification number. Each of these scenes are "Outside Long Bridge", "BMW HQ Munich" and "Interview with Minister". Correspondingly for each scene a number of shots are identified and these are shown below each of the scenes with a unique shot identification number. Notes corresponding to the content of each of these shots are also entered in the second column. So, for example, for the first scene "Outside Long Bridge", three shots are identified which are "Long Bridge BMW", "Workers leaving shift" and "Workers in car park". With this information loaded onto the PDA, the director or indeed a single camera man may take the PDA out to the place where the new story is to be shot, so that the planned audio/video material can be gathered. An illustration of the form of the PDA with the graphical user interface displaying this information is shown in FIG. 8.

As indicated in FIG. 6, the PDA 112 is arranged to communicate data to the camera 111. To this end the metadata generation processor 128 is arranged to communicate data with the PDA 112 via the interface 118. The interface 118 maybe for example an infra-red link 119 providing wireless communications in accordance with a known standard. The PDA and the parts of the camera associated with generating metadata which are shown in FIG. 7 are shown in more detail in FIG. 10.

Figure 10:
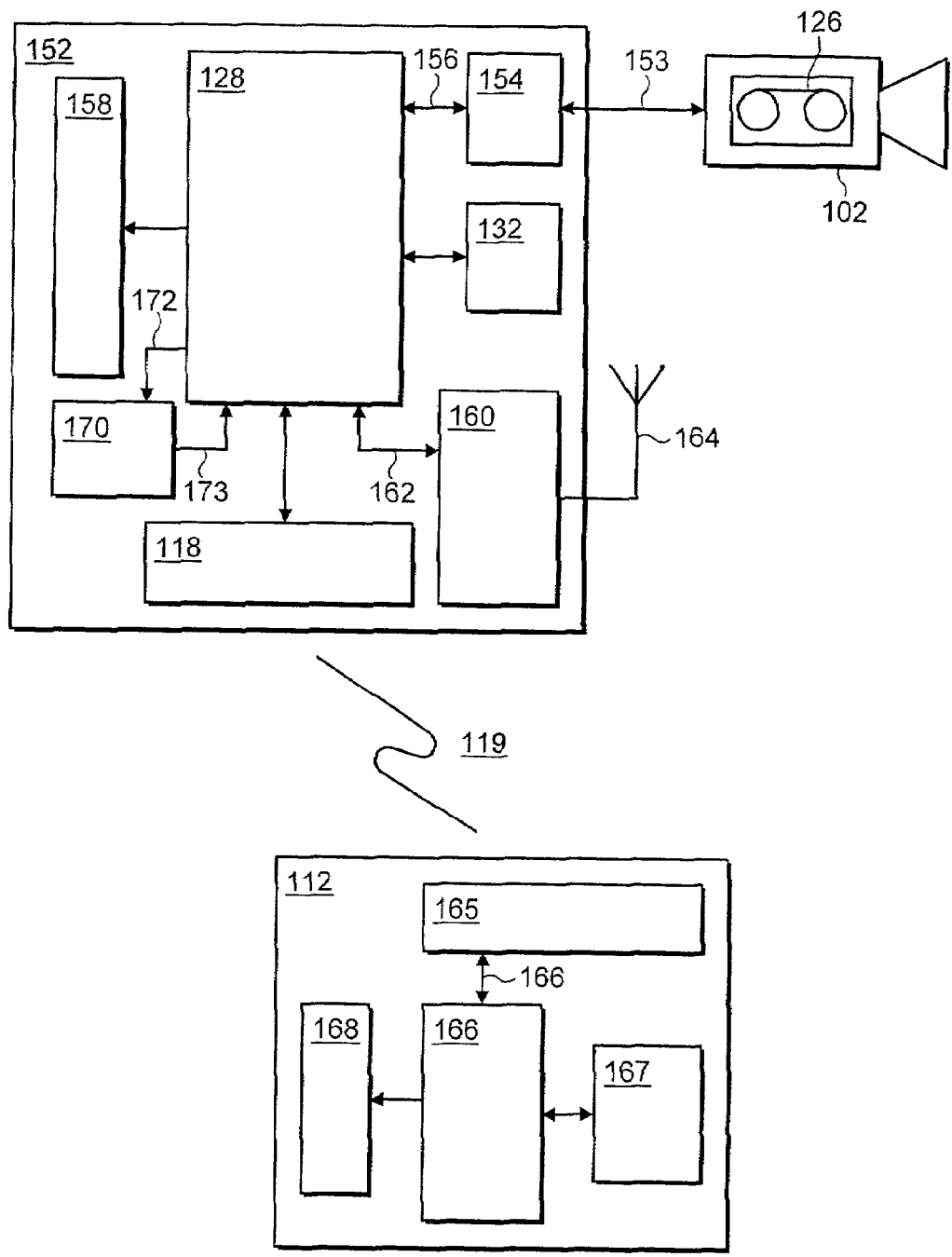

In FIG. 10 the parts of the camera which are associated with generating metadata and communicating with the PDA 112 are shown in a separate acquisition unit 152. However it will be appreciated that the acquisition unit 152 could also be embodied within the camera 102. The acquisition unit 152 comprises the metadata generation processor 128, and the data store 132. The acquisition processor 152 also includes the clock 136 and the sensors 138, 140, 142 although for clarity these are not shown in FIG. 10. Alternatively, some or all of these features which are shown in FIG. 10 will be embodied within the camera 102 and the signals which are required to define the metadata such as the time codes and the audio/video signals themselves may be communicated via a communications link 153 which is coupled to an interface port 154. The metadata generation processor 128 is therefore provided with access to the time codes and the audio/video material as well as other parameters used in generating the audio/video material. Signals representing the time codes end parameters as well as the audio/video signals are received from the interface port 154 via the interface channel 156. The acquisition unit 152 is also provided with a screen (not shown) which is driven by a screen driver 158. Also shown in FIG. 10 the acquisition unit is provided with a communications processor 160 which is coupled to the metadata generation processor 128 via a connecting channel 162. Communications is effected by the communications processor 160 via a radio frequency communications channel using the antennae 164. A pictorial representation of the acquisition unit 152 is shown in FIG. 10.

The PDA 112 is also shown in FIG. 10. The PDA 112 is correspondingly provided with an infra-red communications port 165 for communicating data to and from the acquisition unit 152 via an infra-red link 119. A data processor 166 within the PDA 112 is arranged to communicate data to and from the infra-red port 165 via a connecting channel 166. The PDA 112 is also provided with a data store 167 and a screen driver 168 which are connected to the data processor 166.

Figure 11:
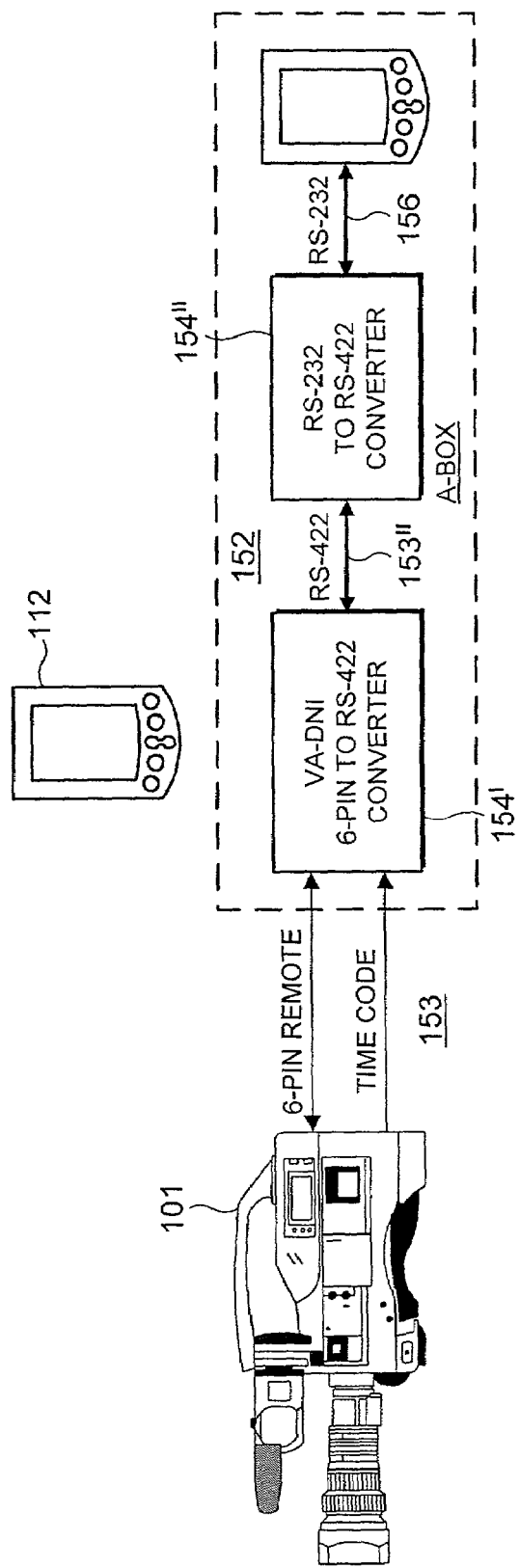

The pictorial representation of the PDA 112 shown in FIG. 8 and the acquisition unit shown in FIG. 10 provide an illustration of an example embodiment of the present invention. A schematic diagram illustrating the arrangement and connection of the PDA 112 and the acquisition unit 152 is shown in FIG. 11. In the example shown in FIG. 11 the acquisition unit 152 is mounted on the back of a camera 101 and coupled to the camera via a six pin remote connector and to a connecting channel conveying the external signal representative of the time code recorded onto the recording tape. Thus, the six pin remote connector and the time code indicated as arrow lines form the communications channel 153 shown in FIG. 9. The interface port 154 is shown in FIG. 11 to be a VA to DN1 conversion comprising an RM-P9/LTC to RS422 converter 154. RM-P9 is a camera remote control protocol, whereas LTC is Linear Time Code in the form of an analogue signal. This is arranged to communicate with a RS422 to RS232 converter 154" via a connecting channel which forms part of the interface port 154. The converter 154" then communicates with the metadata generation processor 128 via the connecting channel 156 which operates in accordance with the RS232 standard.

Returning to FIG. 10, the PDA 112 which has been loaded with the pre-planned production information is arranged to communicate the current scene and shot for which audio/video material is to be generated by communicating the next shot ID number via the infra-red link 119. The pre-planned information may also have been communicated to the acquisition unit 152 and stored in the data store 132 via a separate link or via the infra-red communication link 119. However in effect the acquisition unit 152 is directed to generate metadata in association with the scene or shot ID number which is currently being taken. After receiving the information of the current shot the camera 102 is then operated to make a "take of the shot". The audio/video material of the take is recorded onto the recording tape 126 with corresponding time codes. These time codes are received along with the audio/video material via the interface port 154 at the metadata generation processor 128. The metadata generation processor 128 having been informed of the current pre-planned shot now being taken logs the time codes for each take of the shot. The metadata generation processor therefore logs the IN and OUT time codes of each take and stores these in the data store 132.

Figure 9:
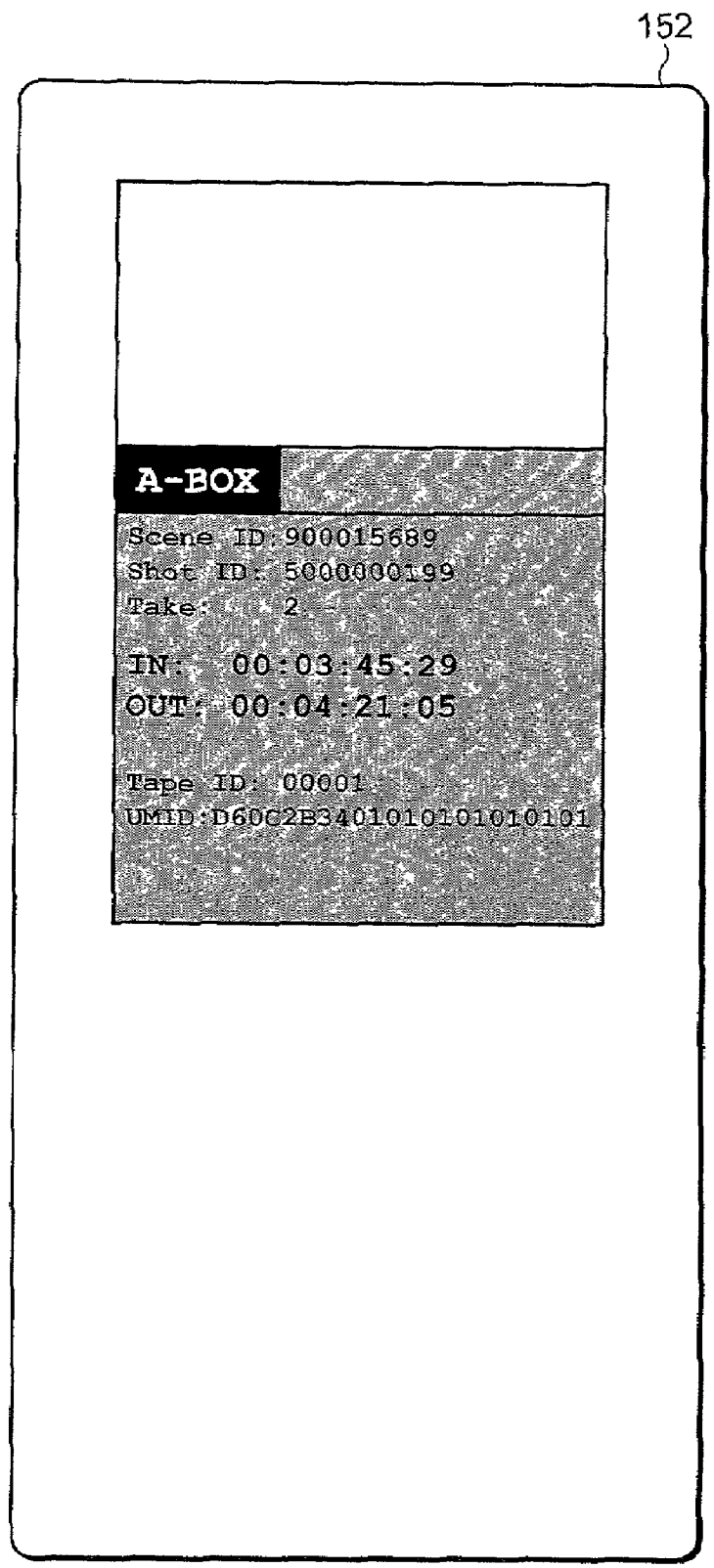

The information generated and logged by the metadata generation processor 128 is shown in the table below. In the first column the scene and shot are identified with the corresponding ID numbers, and for each shot several takes are made by the camera operator which are indicated in a hierarchical fashion. Thus, having received information from the PDA 112 of the current shot, each take made by the camera operator is logged by the metadata generation processor 128 and the IN and OUT points for this take are shown in the second and third columns and stored in the data store 132. This information may also be displayed on the screen of the acquisition unit 152 as shown in FIG. 9. Furthermore, the metadata generation processor 128 as already explained generates the UMID for each take for the audio/video material generated during the take. The UMID for each take forms the fourth column of the table. Additionally, in some embodiments, to provide a unique identification of the tape once which the material is recorded, a tape identification is generated and associated with the metadata. The tape identification may be written on to the tape, or stored on a random access memory chip which is embodied within the video tape cassette body. This random access memory chip is known as a TELEFILE (RTM) system which provides a facility for reading the tape ID number remotely. The tape ID is written onto the magnetic tape 126 to uniquely identify this tape. In preferred embodiments the TELEFILE (RTM) system is provided with a unique number which manufactured as part of the memory and so can be used as the tape ID number. In other embodiments the TELEFILE (RTM) system provides automatically the IN/OUT time codes of the recorded audio/video material items.

In one embodiment the information shown in the table below is arranged to be recorded onto the magnetic tape in a separate recording channel. However, in other embodiments the metadata shown in the table is communicated separately from the tape 126 using either the communications processor 160 or the infra-red link 119. The metadata maybe received by the PDA 112 for analysis and may be further communicated by the PDA.

| Scene ID: 900015689 | Tape ID: 00001 | | UMID: |
|---|---|---|---|
| Shot 5000000199 | | | |
| Take 1 | IN: 00:03:45:29 | OUT: 00:04:21:05 | 060C23B340 . . . |
| Take 2 | IN: 00:04:21:20 | OUT: 00:04:28:15 | 060C23B340 . . . |
| Take 3 | IN: 00:04:28:20 | OUT: 00:05:44:05 | 060C23B340 . . . |
| Shot 5000000200 | | | |
| Take 1 | IN: 00:05:44:10 | OUT: 00:08:22:05 | 060C23B340 . . . |
| Take 2 | IN: 00:08:22:10 | OUT: 00:08:23:05 | 060C23B340 . . . |

The communications processor 160 may be arranged in operation to transmit the metadata generated by the metadata generation processor 128 via a wireless communications link. The metadata maybe received via the wireless communications link by a remotely located studio which can then acquire the metadata and process this metadata ahead of the audio/video material recorded onto the magnetic tape 126. This provides an advantage in improving the rate at which the audio/video production may be generated during the post production phase in which the material is edited.

A further advantageous feature provided by embodiments of the present invention is an arrangement in which a picture stamp is generated at certain temporal positions within the recorded audio/video signals. A picture stamp is known to those skilled in the art as being a digital representation of an image and in the present example embodiment is generated from the moving video material generated by the camera. The picture stamp may be of lower quality in order to reduce an amount of data required to represent the image from the video signals. Therefore the picture stamp may be compression encoded which may result in a reduction in quality. However a picture stamp provides a visual indication of the content of the audio/video material and therefore is a valuable item of metadata. Thus, the picture stamp may for example be generated at the IN and OUT time codes of a particular take. Thus, the picture stamps may be associated with the metadata generated by the metadata generation processor 128 and stored in the data store 132. The picture stamps are therefore associated with items of metadata such as, for example, the time codes which identify the place on the tape where the image represented by the picture stamp is recorded. The picture stamps may be generated with the "Good Shot" markers. The picture stamps are generated by the metadata generation processor 128 from the audio/video signals received via the communications link 153. The metadata generation processor therefore operates to effect a data sampling and compression encoding process in order to produce the picture stamps. Once the picture stamps have been generated they can be used for several purposes. They may be stored in a data file and communicated separately from the tape 126, or they may be stored on the tape 126 in compressed form in a separate recording channel. Alternatively in preferred embodiments picture stamps may be communicated using the communications processor 160 to the remotely located studio where a producer may analysis the picture stamps. This provides the producer with an indication as to whether the audio/video material generated by the camera operator is in accordance with what is required.

In a yet further embodiment, the picture stamps are communicated to the PDA 112 and displayed on the PDA screen. This may be effected via the infra-red port 119 or the PDA may be provided with a further wireless link which can communicate with the communications processor 160. In this way a director having the hand held PDA 112 is provided with an indication of the current audio/video content generated by the camera. This provides an immediate indication of the artist and aesthetic quality of the audio/video material currently being generated. As already explained the picture stamps are compression encoded so that they may be rapidly communicated to the PDA.

A further advantage of the acquisition unit 152 shown in FIG. 10 is that the editing process is made more efficient by providing the editor at a remotely located studio with an indication of the content of the audio/video material in advance of receiving that material. This is because the picture stamps are communicated with the metadata via a wireless link so that the editor is provided with an indication of the content of the audio/video material in advance of receiving the audio/video material itself. In this way the bandwidth of the audio/video material can remain high with a correspondingly high quality whilst the metadata and picture stamps are at a relatively low band width providing relatively low quality information. As a result of the low band width the metadata and picture stamps may be communicated via a wireless link on a considerably lower band width channel. This facilitates rapid communication of the metadata describing content of the audio/video material.

The picture stamps generated by the metadata generation processor 128 can be at any point during the recorded audio/video material. In one embodiment the picture stamps are generated at the IN and OUT points of each take. However in other embodiments of the present invention an activity processor 170 is arranged to detect relative activity within the video material. This is effected by performing a process in which a histogram of the colour components of the images represented by the video signal is compiled and the rate of change of the colour components determined and changes in these colour components used to indicate activity within the image. Alternatively or in addition, motion vectors within the image are used to indicate activity. The activity processor 176 then operates to generate a signal indicative of the relative activity within the video material. The metadata generation processor 128 then operates in response to the activity signal to generate picture stamps such more picture stamps are generated for greater activity within the images represented by the video signals.

In an alternative embodiment of the present invention the activity processor 170 is arranged to receive the audio signals via the connecting channel 172 and to recognise speech within the audio signals. The activity processor 170 then generates content data representative of the content of this speech as text. The text data is then communicated to the data processor 128 which may be stored in the data store 132 or communicated with other metadata via the communications processor 160 in a similar way to that already explained for the picture stamps.

Figure 12:
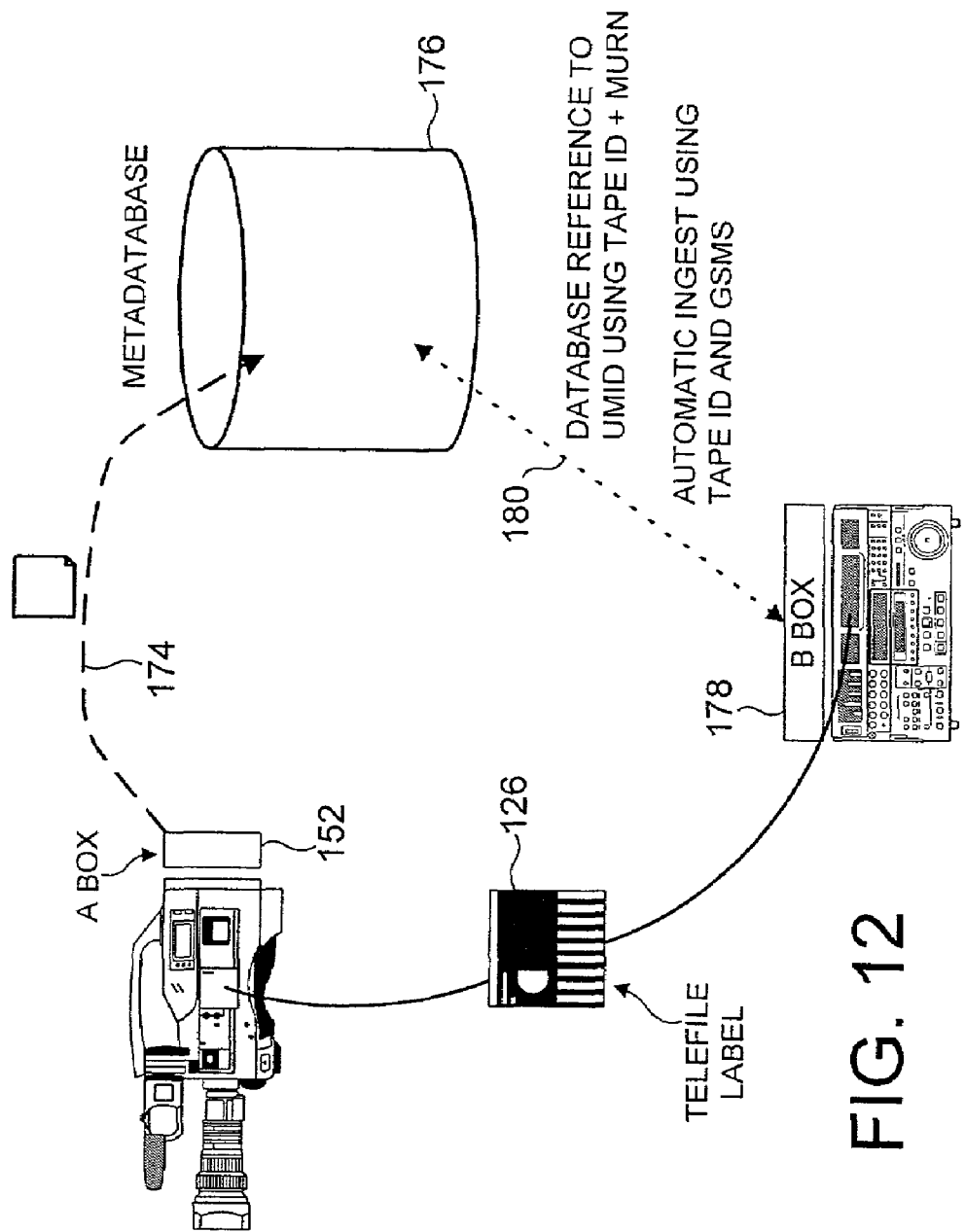

FIG. 12 provides a schematic representation of a post production process in which the audio/video material is edited to produce an audio/video program. As shown in FIG. 12 the metadata, which may include picture stamps and/or the speech content information is communicated from the acquisition unit 152 via a separate route represented by a broken line 174, to a metadata database 176. The route 174 may be representative of a wireless communications link formed by for example UMTS, GSM or the like.

The database 176 stores metadata to be associated with the audio/video material. The audio/video material in high quality form is recorded onto the tape 126. Thus the tape 126 is transported back to the editing suite where it is ingested by an ingestion processor 178. The tape identification (tape ID) recorded onto the tape 126 or other metadata providing an indication of the content of the audio/video material is used to associate the metadata stored in the data store 176 with the audio/video material on the tape as indicated by the broken line 180.

As will be appreciated although the example embodiment of the present invention uses a video tape as the recording medium for storing the audio/video signals, it will be understood that alternative recording medium such as magnetic disks and random access memories may also be used.

B Box FIGS. 13 to 18

B-Box

As described above, embodiments of the present invention use VTRs 411, 417 associated with B-Boxes 412. An embodiment of a B-Box 412 will now be described with reference to FIGS. 13 to 18.

Figure 13:
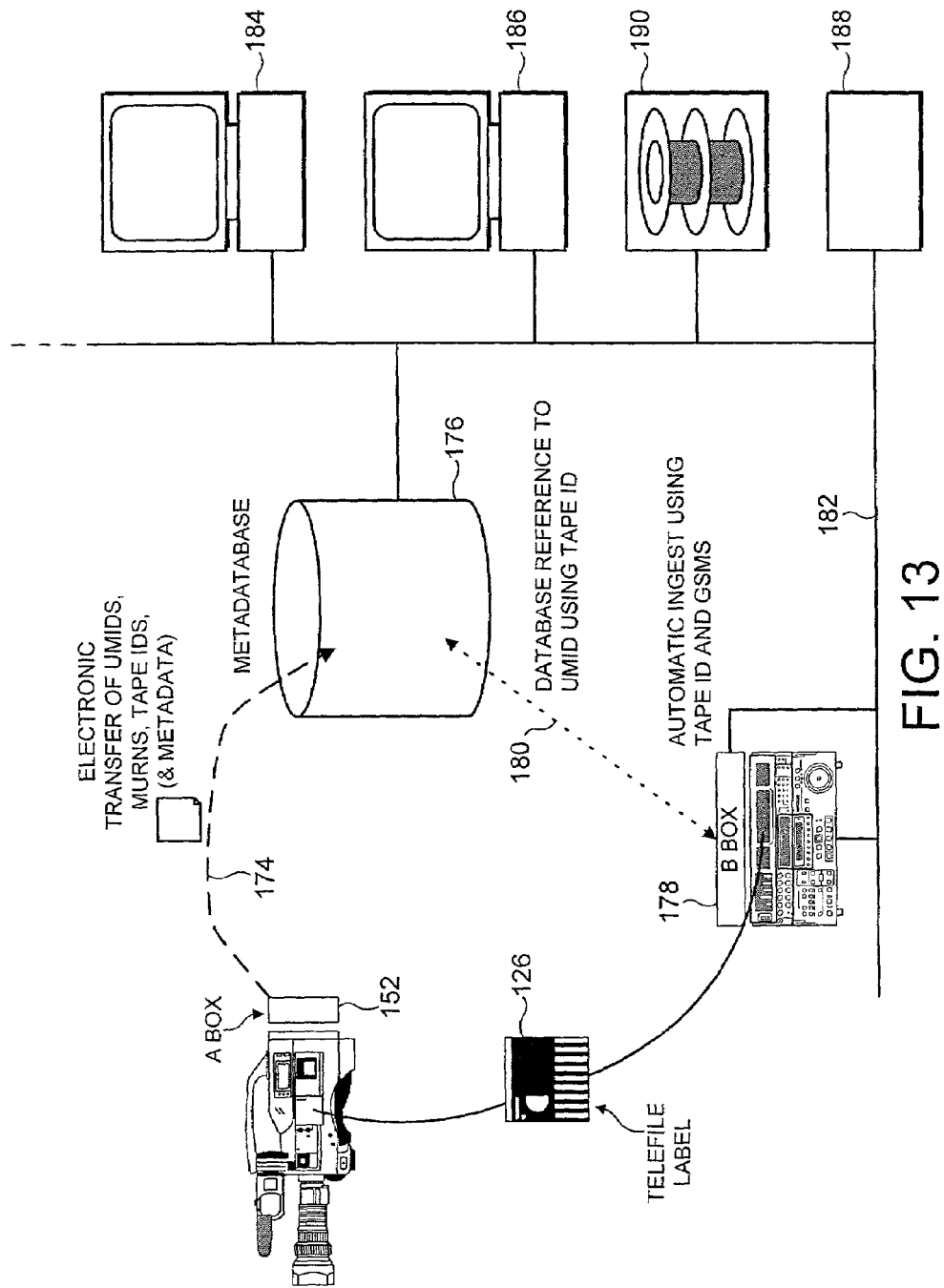

FIG. 13 provides a schematic representation of a post production process in which the audio/video material is edited to produce an audio/video program. As shown in FIG. 13 the metadata, which may include picture stamps and/or the speech content information is communicated from the acquisition unit 152 via a separate route represented by a broken line 174, to a metadata database 176. The route 174 may be representative of a wireless communications link formed by for example UMTS, GSM or the like.

The database 176 stores metadata to be associated with the audio/video material. The audio/video material in high quality form is recorded onto the tape 126. Thus the tape 126 is transported back to the editing suite where it is ingested by an ingestion processor 178. The tape identification (tape ID) recorded onto the tape 126 or other metadata providing an indication of the content of the audio/video material is used to associate the metadata stored in the data store 176 with the audio/video material on the tape as indicated by the broken line 180.

The ingestion processor 178 is also shown in FIG. 13 to be connected to a network formed from a communications channel represented by a connecting line 182. The connecting line 182 represents a communications channel for communicating data to items of equipment, which form an inter-connected network. To this end, these items of equipment are provided with a network card which may operate in accordance with a known access technique such as Ethernet, RS422 and the like. Furthermore, as will be explained shortly, the communications network 182 may also provide data communications in accordance with the Serial Digital Interface (SDI) or the Serial Digital Transport Interface (SDTI).

Also shown connected to the communications network 182 is the metadata database 176, and an audio/video server 190, into which the audio/video material is ingested. Furthermore, editing terminals 184, 186 are also connected to the communications channel 182 along with a digital multi-effects processor 188.

The communications network 182 provides access to the audio/video material present on tapes, discs or other recording media which are loaded into the ingestion processor 178.

The metadata database 176 is arranged to receive metadata via the route 174 describing the content of the audio/video material recorded on to the recording media loaded into the ingestion processor 178.

As will be appreciated although in the example embodiment a video tape has been used as the recording medium for storing the audio/video signals, it will be understood that alternative recording media such as magnetic disks and random access memories may also be used, and that video tape is provided as an illustrative example only.

The editing terminals 184, 186 digital multi-effects processor 188 are provided with access to the audio/video material recorded on to the tapes loaded into the ingestion processor 178 and the metadata describing this audio/video material stored in the metadata database 176 via the communications network 182. The operation of the ingestion processor with 178 in combination with the metadata database 176 will now be described in more detail.

Figure 14:
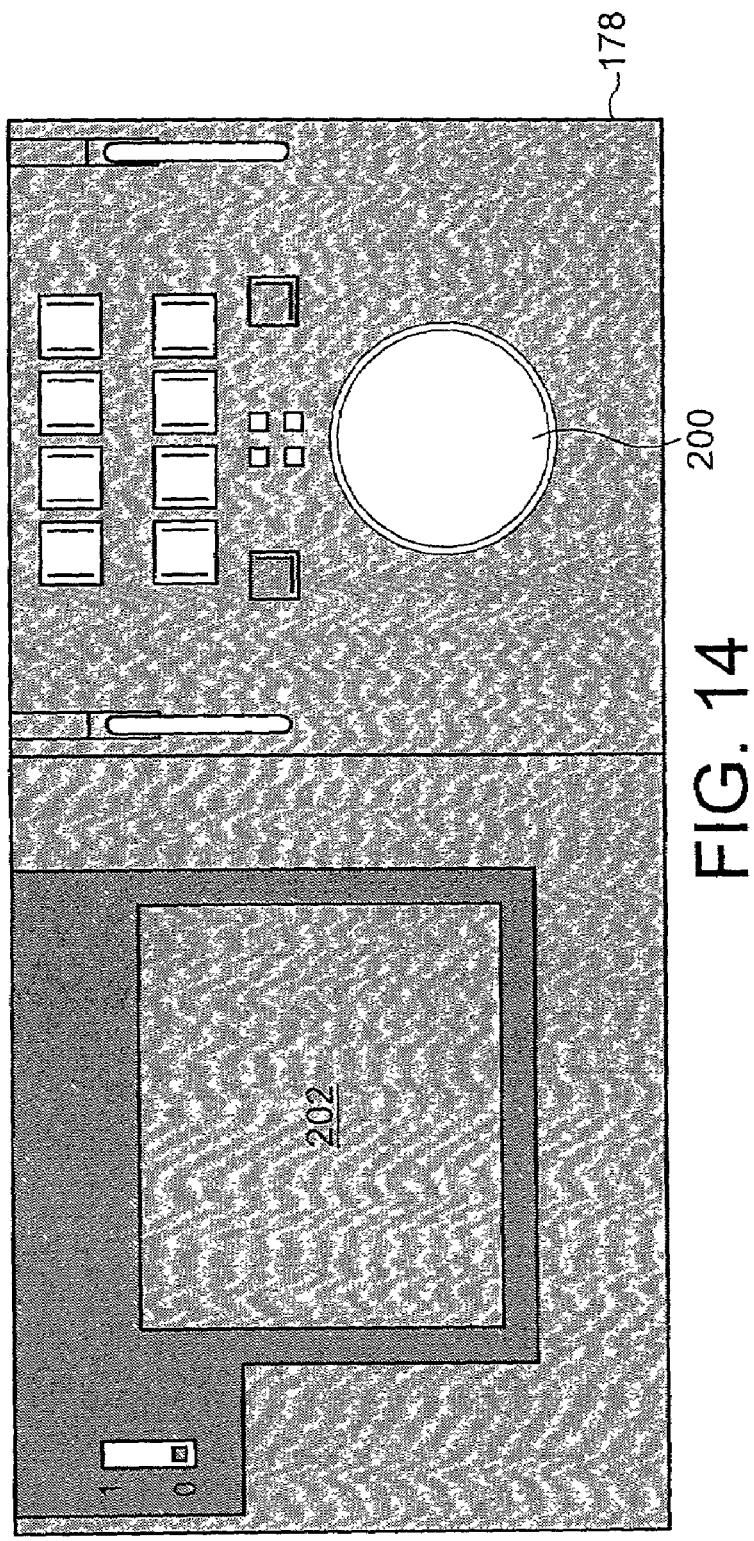

FIG. 14 provides an example representation of the ingestion processor 178. In FIG. 14 the ingestion processor 178 is shown to have a jog shuttle control 200 for navigating through the audio/video material recorded on the tapes loaded into video tape recorders/reproducers forming part of the ingestion processor 178. The ingestion processor 178 also includes a display screen 202 which is arranged to display picture stamps which describe selected parts of the audio/video material. The display screen 202 also acts as a touch screen providing a user with the facility for selecting the audio/video material by touch. The ingestion processor 178 is also arranged to display all types of metadata on the screen 202 which includes script, camera type, lens types and UMIDs.

Figure 15:
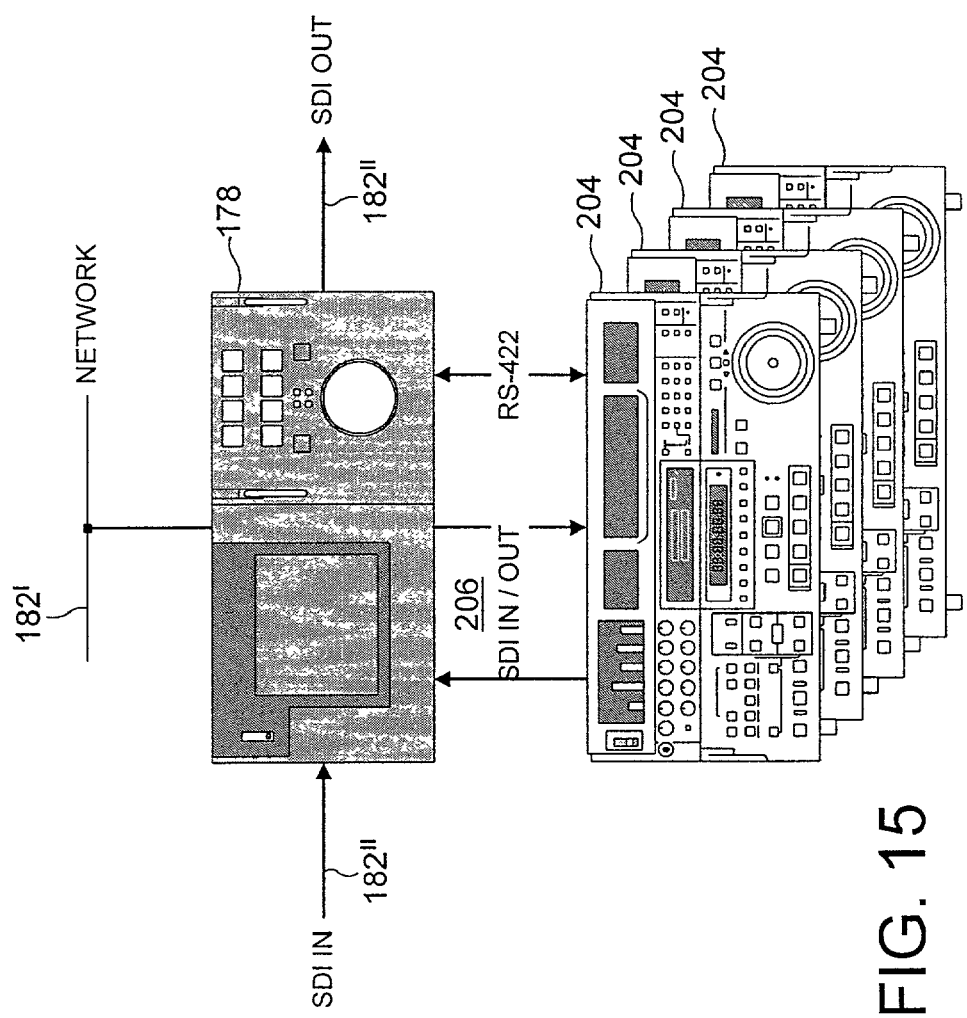

As shown in FIG. 15, the ingestion processor 178 may include a plurality of video tape recorders/reproducers into which the video tapes onto which the audio/video material is recorded may be loaded in parallel. In the example shown in FIG. 15, the video tape recorders 204 are connected to the ingestion processor 178 via an RS422 link and an SDI IN/OUT link. The ingestion processor 178 therefore represents a data processor which can access any of the video tape recorders 204 in order to reproduce the audio/video material from the video tapes loaded into the video tape recorders. Furthermore, the ingestion processor 178 is provided with a network card in order to access the communications network 182. As will be appreciated from FIG. 15 however, the communications channel 182 is comprised of a relatively low band width data communications channel 182' and a high band width SDI channel 182" for use in streaming video data. Correspondingly, therefore the ingestion processor 178 is connected to the video tape recorders 204 via an RS422 link in order communicate requests for corresponding items of audio/video material. Having requested these items of audio/video material, the audio/video material is communicated back to the ingestion processor 178 via an SDI communication link 206 for distribution via the SDI network. The requests may for example include the UMID which uniquely identifies the audio/video material item(s).

Figure 16:
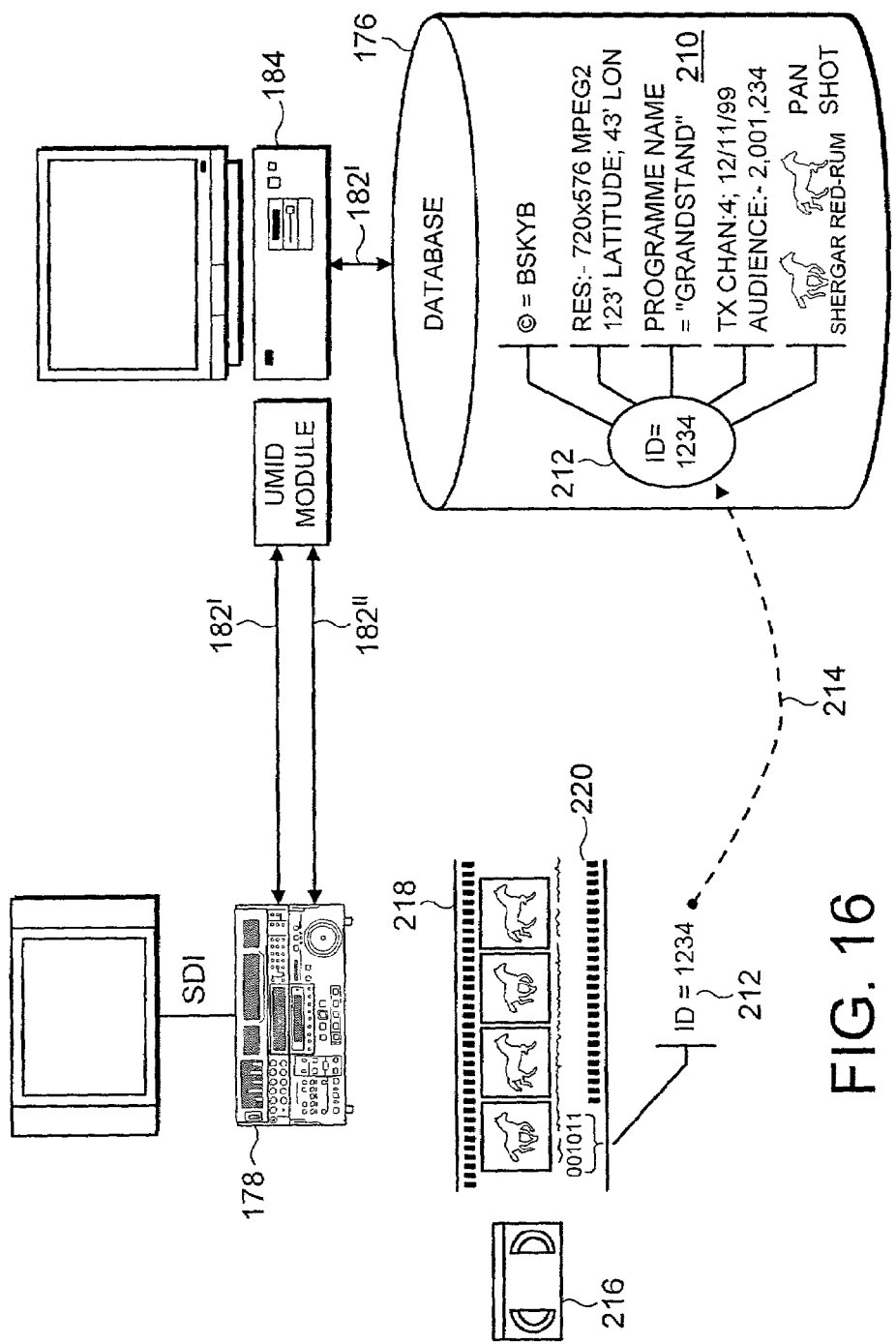

The operation of the ingestion processor in association with the metadata database 176 will now be explained with reference to FIG. 16. In FIG. 16 the metadata database 176 is shown to include a number of items of metadata 210 associated with a particular tape ID 212. As shown by the broken line headed arrow 214, the tape ID 212 identifies a particular video tape 216, on which the audio/video material corresponding to the metadata 210 is recorded. In the example embodiment shown in FIG. 16, the tape ID 212 is written onto the video tape 218 in the linear time code area 220. However it will be appreciated that in other embodiments, the tape ID could be written in other places such as the vertical blanking portion. The video tape 216 is loaded into one of the video tape recorders 204 forming part of the ingestion processor 178.

In operation one of the editing terminals 184 is arranged to access the metadata database 176 via the low band width communications channel 182' the editing terminal 184 is therefore provided with access to the metadata 210 describing the content of the audio/video material recorded onto the tape 216. The metadata 210 may include such as the copyright owner "BSkyB", the resolution of the picture and the format in which the video material is encoded, the name of the program, which is in this case "Grandstand", and information such as the date, time and audience. Metadata may further include a note of the content of the audio/video material.

Each of the items of audio/video material is associated with a UMID, which identifies the audio/video material. As such, the editing terminal 184 can be used to identify and select from the metadata 210 the items of audio/video material which are required in order to produce a program. This material may be identified by the UMID associated with the material. In order to access the audio/video material to produce the program, the editing terminal 184 communicates a request for this material via the low band width communications network 182. The request includes the UMID or the UMIDs identifying the audio/video material item(s). In response to the request for audio/video material received from the editing terminal 184, the ingestion processor 178 is arranged to reproduce selectively these audio/video material items identified by the UMID or UMIDs from the video tape recorder into which the video cassette 216 is loaded. This audio/video material is then streamed via the SDI network 182" back to the editing terminal 184 to be incorporated into the audio/video production being edited. The streamed audio/video material is ingested into the audio/video server 190 from where the audio/video can be stored and reproduced.

Figure 17:
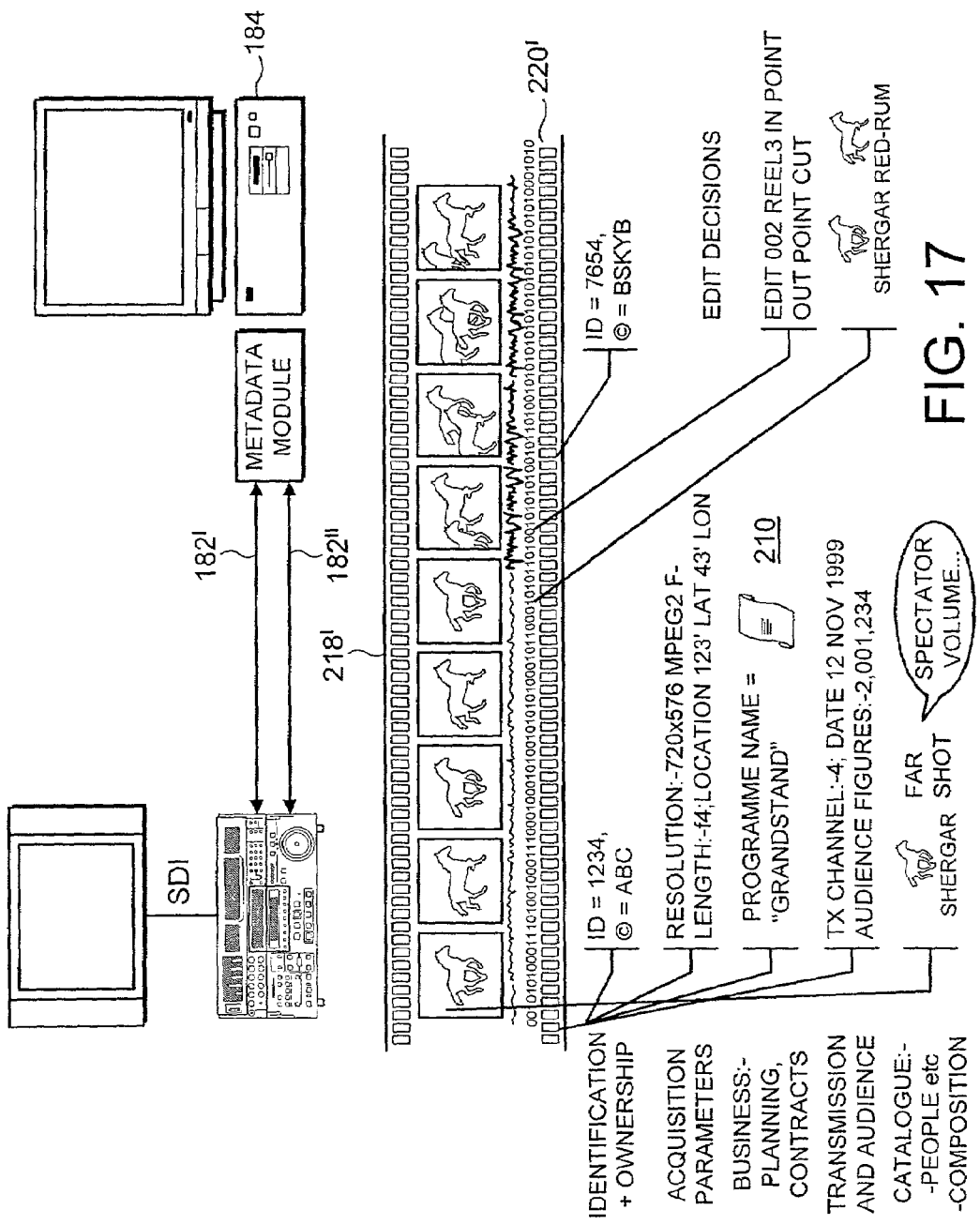

FIG. 17 provides an alternative arrangement in which the metadata 210 is recorded onto a suitable recording medium with the audio/video material. For example the metadata 210 could be recorded in one of the audio tracks of the video tape 218'. Alternatively, the recording medium may be an optical disc or magnetic disc allowing random access and providing a greater capacity for storing data. In this case the metadata 210 may be stored with the audio/video material.

In a yet further arrangement, some or all of the metadata may be recorded onto the tape 216. This may be recorded, for example, into the linear recording track of the tape 218. Some metadata related to the metadata recorded onto the tape may be conveyed separately and stored in the database 176. A further step is required in order to ingest the metadata and to this end the ingestion processor 178 is arranged to read the metadata from the recording medium 218' and convey the metadata via the communications network 182' to the metadata database 176. Therefore, it will be appreciated that the metadata associated with the audio/video material to be ingested by the ingestion processor 178 may be ingested into the database 176 via a separate medium or via the recording medium on which the audio/video material is also recorded.

The metadata associated with the audio/video material may also include picture stamps which represent low quality representations of the images at various points throughout the video material. These may be presented at the touch screen 202 on the ingestion processor 178. Furthermore these picture stamps may be conveyed via the network 182' to the editing terminals 184, 186 or the effects processor 188 to provide an indication of the content of the audio/video material. The editor is therefore provided with a pictorial representation for the audio/video material and from this a selection of an audio/video material items may be made. Furthermore, the picture stamp may stored in the database 176 as part of the metadata 210. The editor may therefore retrieve a selected item for the corresponding picture stamp using the UMID which is associated with the picture stamp.

In other embodiments of the invention, the recording medium may not have sufficient capacity to include picture stamps recorded with the audio/video material. This is likely to be so if the recording medium is a video tape 216. It is particularly appropriate in this case, although not exclusively so, to generate picture stamps before or during ingestion of the audio/video material.

Returning to FIG. 13, in other embodiments, the ingestion processor 178 may include a pre-processing unit. The pre-processing unit embodied within the ingestion processor 178 is arranged to receive the audio/video material recorded onto the recording medium which, in the present example is a video tape 126. To this end, the pre-processing unit may be provided with a separate video recorder/reproducer or may be combined with the video tape recorder/reproducer which forms part of the ingestion processor 178. The pre-processing unit generates picture stamps associated with the audio/video material. As explained above, the picture stamps are used to provide a pictorial representation of the content of the audio/video material items. However in accordance with a further embodiment of the present invention the pre-processing unit operates to process the audio/video material and generate an activity indicator representative of relative activity within the content of the audio/video material. This may be achieved for example using a processor which operates to generate an activity signal in accordance with a histogram of colour components within the images represented by the video signal and to generate the activity signals in accordance with a rate of change of the colour histogram components. The pre-processing unit then operates to generate a picture stamp at points throughout the video material where there are periods of activity indicated by the activity signal. This is represented in FIG. 18. In FIG. 18a picture stamps 224 are shown to be generated along a line 226 which is representing time within the video signal. As shown in FIG. 18a the picture stamps 224 are generated at times along the time line 226 where the activity signal represented as arrows 228 indicates events of activity. This might be for example someone walking into and out of the field of view of the camera where there is a great deal of motion represented by the video signal. To this end, the activity signal may also be generated using motion vectors which may be, for example, the motion vectors generated in accordance with the MPEG standard.

In other embodiments of the invention, the pre-processor may generate textual information corresponding to speech present within the audio signal forming part of the audio/video material items stored on the tape 126. The textual information may be generated instead of the picture stamps or in addition to the picture stamps. In this case, text may be generated for example for the first words of sentences and/or the first activity of a speaker. This is detected from the audio signals present on the tape recording or forming part of the audio/video material. The start points where text is to be generated is represented along the time line 226 as arrows 230. Alternatively the text could be generated at the end of sentences or indeed at other points of interest within the speech.

At the detected start of the speech, a speech processor operates to generate a textual representation of the content of the speech. To this end, the time line 226 shown in FIG. 18*b* is shown to include the text 232 corresponding to the content of the speech at the start of activity periods of speech.

The picture stamps and textual representation of the speech activity generated by the pre-processor is communicated via the communications channel 182 to the metadata database 176 and stored. The picture stamps and text are stored in association with the UMID identifying the corresponding items of audio/video material from which the picture stamps 224 and the textual information 232 were generated. This therefore provides a facility to an editor operating one of the editing terminals 184, 186 to analyse the content of the audio/video material before it is ingested using the ingestion processor 178. As such the video tape 126 is loaded into the ingestion processor 178 and thereafter the audio/video material can be accessed via the network communications channel 182. The editor is therefore provided with an indication, very rapidly, of the content of the audio/video material and so may ingest only those parts of the material, which are relevant to the particular material items required by the editor. This has a particular advantage in improving the efficiency with which the editor may produce an audio/video production.

In an alternative embodiment, the pre-processor may be a separate unit and may be provided with a screen on which the picture stamps and/or text information are displayed, and a means such as, for example, a touch screen, to provide a facility for selecting the audio/video material items to be ingested.

In a further embodiment of the invention, the ingestion processor 178 generates metadata items such as UMIDs whilst the audio/video material is being ingested. This may required because the acquisition unit in the camera 152 is not arranged to generate UMIDs, but does generate a Unique Material Reference Number (MURN). The MURN is generated for each material item, such as a take. The MURN is arranged to be considerably shorter than a UMID and can therefore be accommodated within the linear time code of a video tape, which is more difficult for UMIDs because these are larger. Alternatively the MURN may be written into a TELEFILE (RTM) label of the tape. The MURN provides a unique identification of the audio/video material items present on the tape. The MURNs may be communicated separately to the database 176 as indicated by the line 174. A MURN may comprise an identifier identify a particular tape (tape Id) and IN and OUT parts of each slot or take on the tape.

At the ingestion processor 178, the MURN for the material items are recovered from the tape or the TELEFILE label. For each MURN, the ingestion processor 178 operates to generate a UMID corresponding to the MURN. The UMIDs are then communicated with the MURN to the database 176, and are ingested into the database in association with the MURNs, which may be already present within the database 176.

Metadata Overview FIGS. 17 and 19 to 21

Metadata—an Overview

Figures

Figure 20A:
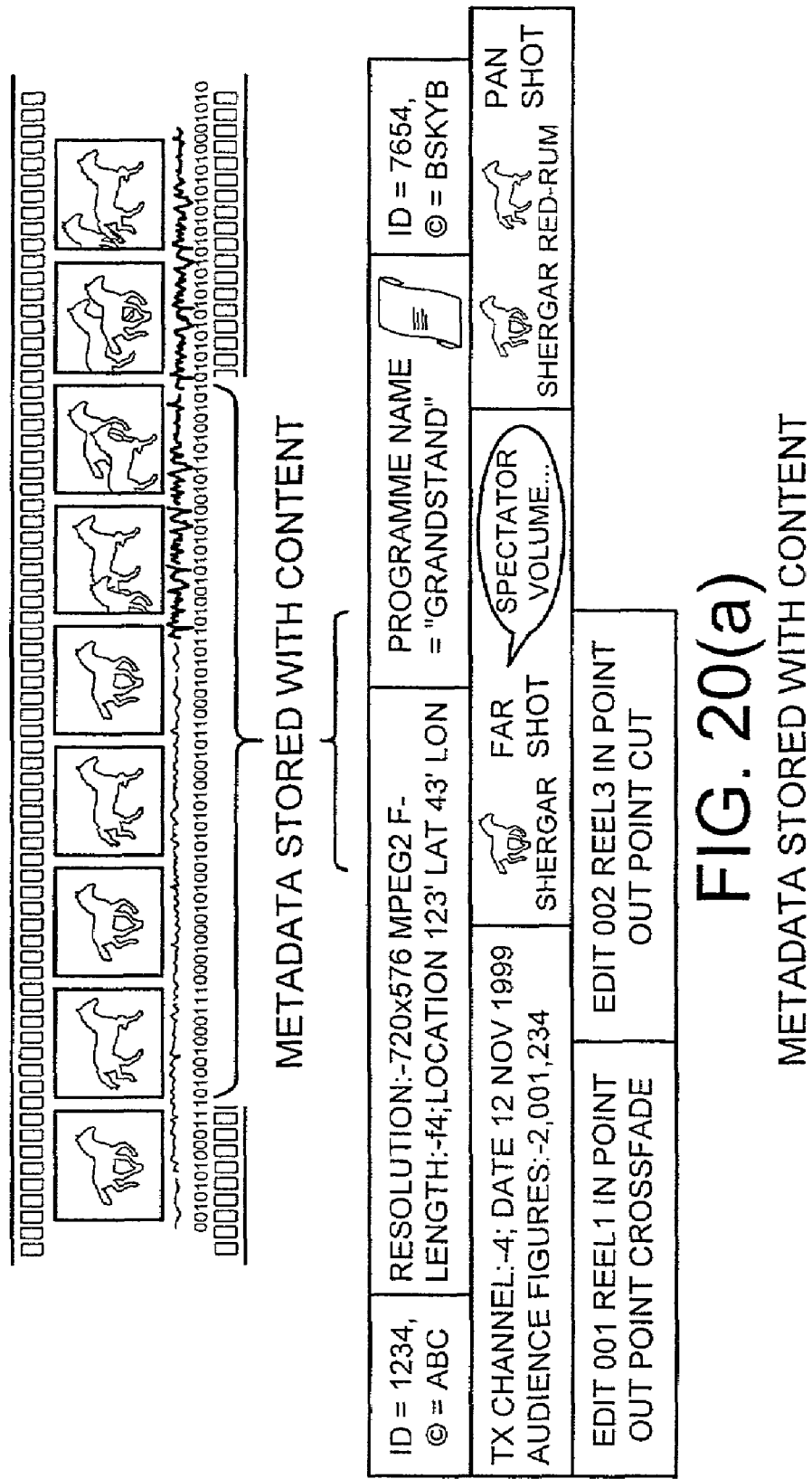
Figure 20B:
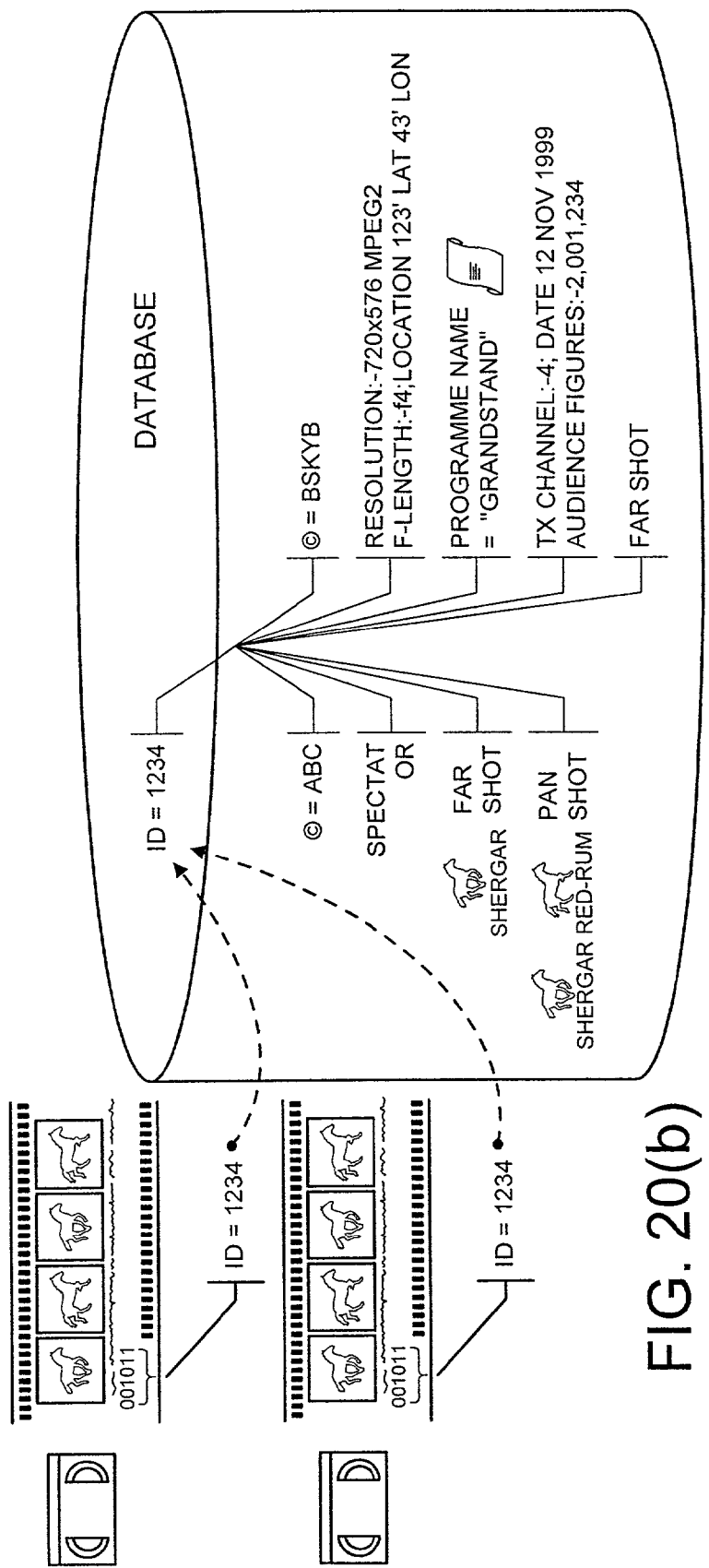
Figure 21:
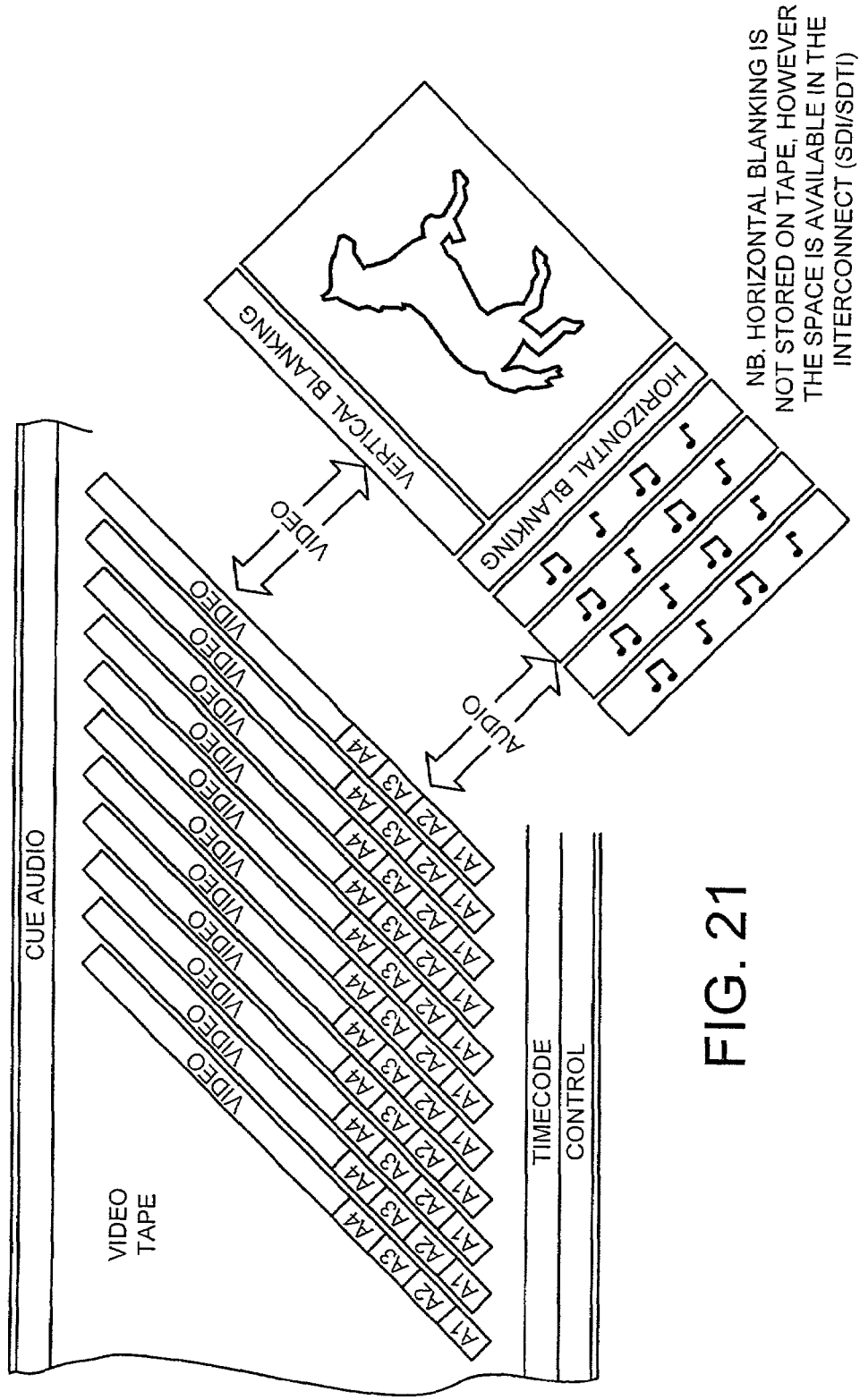

FIG. 17 illustrates a small proportion of the metadata which may be produced in the creation and transmission of a programme such as horse racing;

FIG. 19 is a simplified schematic illustration of a layered metadata structure;

FIG. 20 illustrates two ways of storing metadata within a system which produces and/or distributes audio and/or video data; and FIG. 21 is a basic illustration of where audio and video may be stored on video tape.

Metadata Overview

For the purposes of this discussion, "material" is video and audio information for example a video programme recorded on a video tape. Metadata is the data and information that is created and used during the lifecycle of material production and distribution. It includes for example:—

Media Content Identification

Copyright

Programme planning

Scripts (lighting, anchor-man, camera . . . )

Edit decisions

Contracts (Cast, Commissioning, Sales, Transmission rights)

Systems Layers (Compression format/rate, EPG . . . )

Other data and information relevant to material

Manual annotations or automatic annotations of material

UMIDs and other identifiers. UMIDs are described in the section 'UMIDs'. They are unique material identifiers which are used in embodiments of the present invention to bind the material to the metadata.

Media includes tape, disc and other media on which information can be recorded.

Referring to FIG. 17, FIG. 17 illustrates a small proportion of the metadata which may be produced in the creation and transmission of a programme such as horse racing.

The metadata includes data which may be produced during planning of the programme and before the making of the programme such as Identification and Ownership data and Business, Planning and Contracts data.

It also includes data produced during and after the making of the programme such as Material/Instance parameters, Edit Decisions, and technical data such as resolution and focal length, and location. By way of explanation: a material number identifies an original clip; and an Instance number identifies a version or copy of the original clip. Thus instance 0 is the original clip and instance 1 is the first copy.

The metadata also includes data created after the transmission of the programme such as the Transmission and Audience data and Catalogue data.

FIG. 17 illustrates only some examples of metadata. Other examples include information required for digital video broadcast transmission such as compression type and rate. Yet other examples of metadata are given in the section Metadata above.

Metadata Uses

Table 5 at the end of this description identifies an extremely simplified view of some metadata. It lists where the data is created within the production chain, and where it is used.

Once metadata is created, stored and accessible, it may be used many times in many stages of subsequent handling of the material. Many of the items listed above may be written once and read many times at different stages in the production and distribution chain. For example a Good Shot Marker (GSM) records or identifies good shots in material, as it is acquired. By preserving the GSM markers with the material, they are available to be read many times within an editing session. Additionally should the material be re-purposed, or recovered from archive, the GSM's are still available to the next user.

The script may be preserved as metadata. For example the script (Row 2) is created in the scripting stage, and used in both the creation and the content creation stages of production and in the distribution stage. The script contains both data content (the words to be spoken) and metadata (descriptions of the scene). The script also contains descriptions of the characters who speak the words and also descriptions of scenes. Thus when preserved as metadata, the script can be used both in the production of enhanced formats by supplying extra user information such as the spoken lines as well as providing navigation data to enable searching in an archival system.

Metadata Structure

FIG. 19 is a simplified schematic illustration of a layered metadata structure. The structure has the following layers:

Application: which is a tool within a production stage where A/V and/or Data is to be used and manipulated.

Syntax: which represents how a standard dictionary items used to describe the image or sound will be represented in a data syntax (or grammar).

Dictionary: defines an agreed set of terms to describe the data (i.e. a dictionary). For example "Dog Name" instead of "Pet Name" or "Animal Name".

Data Coding: this layer adds the specific methods of data encapsulation. It may include multiple coding layers applied in a recursive manner to complete a 'wrapper' or 'file' format.

Transfer/Storage: this layer comprises the two parallel paths of streaming (file/stream transfer) and storage which allow the transfer of the material and metadata to, and/or storage of the material and metadata in, for example networked processors and storage media.

Physical: this layer represents how the data is electrically or magnetically stored or transmitted.

Some international standards or proposed standards which may be applied to the layers are set out in the following Table I:

TABLE I

| Standard | SMPTE Dictionaries | SMPTE KLV | MPEG-7 | AAF (MXF/AXF) | XML | SDTI-CP |
|---|---|---|---|---|---|---|
| Application | | | | | | X |
| Syntax | | X | X | X | | |
| Dictionary | X | | X | X | | |
| Data Coding | | X | X | X | X | X |
| Physical | | X | | X | X | X |

Embodiments of the present invention use metadata within an audio and video production and distribution system to augment the operation of the system. Metadata is stored in the system. FIG. 20 illustrates two ways of storing metadata within a system: both represent the metadata created in the example of FIG. 17. In FIG. 20(*a*), all of the metadata is stored within a content server or a content tape. How to store metadata on tape is discussed later. In FIG. 20(*b*), only a reference identifier is stored with the content, and this reference matches a single copy of data held within a database.

Metadata is dynamic. For example consider the life of a piece of material:

Metadata is created at the planning stage
Metadata is created at the production stage
Editing existing material creates new composite material which is identified and described by metadata
Each sale of material updates the ownership and/or contract metadata
Each transmission, adds the new transmission date, and audience viewing figures
Archive catalogue updates indexes, or corrects indexes.

The dynamic nature of metadata has consequences for the two options illustrated in FIG. 20. Where the metadata is stored with the content (FIG. 20*a*) whenever the metadata is changed, all copies of the material are found, and the metadata of each copy is updated. However with a single copy of metadata held within a database (FIG. 20*b*), as the metadata is changed, the copies of content are unaffected. The UMIDs which are the unique material ID that bind the metadata to content never change.

Separating the metadata from the content by storing it in a database has a number of advantages over embedding metadata with the content. For example, it allows an increase in data storage size and the ability to search data using high-speed random access techniques.

Although the use of a database may be optimum to preserve data integrity, it may not be optimum for all practical installations. Where content is exchanged across physical sites, or where secure network connections are neither available nor economic embedding the data with the content may be necessary.

Storage of Metadata on Tape

Embodiments of the present invention allow the storage of metadata on tape for existing installations, using a format that is compatible with current VTR equipment and IT infrastructure. Embodiments of the invention also allow the storage of metadata on emerging formats e.g. MXF for tape or optical disk.

Storage of Metadata on Video Tape

FIG. 21 is a basic illustration of where audio and video are stored on video tape (analogue and digital). In this simplified illustration there a number of elements:—a video track, four audio tracks ($A_1$ to $A_4$), a time code track, a control track and linear audio cue track.

To add metadata to existing video tape formats, the data is included in one or more of these existing tracks. There are a number of "spaces" available (shown shaded in FIG. 21), that can store data, and which have only a small impact on the storage of audio and video on the tape. These are listed below in Table II.

TABLE II

| | | | | Approx Capacity | | | |
|---|---|---|---|---|---|---|---|
| Area | Description | Impact on A/V | Editablity | Digital Betacam | D1 | SX, MX, Servers | HD-CAM2 |
| Vertical blanking Interval (VBI) | The non-visible video lines stored above the real image | None or small | Insert with Video | 4000 approx Bytes/Sec (teletext like) | 200 Kbytes/Sec | 72 KBytes/Sec | 12 Kbytes/Sec |
| An audio Track | Use one (or more) audio tracks to store data | Loss of an audio track | Insert without effecting A/V | per track 96 KBytes per Sec | per track 96 KBytes per Sec | per track 96 KBytes per Sec | per track 96 KBytes per Sec |
| Time-code user bits | Use the user-bits area of the time-code | None | Insert without effecting A/V | 200 Bytes/Sec | 200 Bytes/Sec | 200 Bytes/Sec | 200 Bytes/Sec |
| Other | | None | | N/a | N/a | 500–2000 Byte/Sec | N/a |
| Horizontal Blanking | Suitable for networking Only | N/a | N/a | N/a | N/a | N/a | N/a |

Most preferably UMIDs are stored on the tape. UMIDs can be accommodated on existing tape. For example the user bits can store UMIDs to 0.2 second resolution. However the UMIDs may be stored elsewhere and other identifiers stored on the tape as described in the section 'Tape IDs'.

Storage of Metadata on Emerging Tape/Optical Disk File Formats

Newly proposed removable-media (tape and optical disk) and fixed media (hard-disk) products are able to interchange computer files. In the standardisation process of the formats for such interchangeable files, the needs of Audio/Video content and metadata are addressed.

The MXF (media exchange format) is designed for exchange of final material, play-out and long-term storage. The format provides four essential parts to the file:—

The identification of media and encoding format
Complex metadata description
Streaming A/V content, with streaming synchronised metadata if necessary
Indexing (allowing cue to time-codes).

Benefits

The systematic use of metadata within the content creation industry according to embodiments of the present invention provides many benefits including:

Increase productivity, allowing a higher proportion of resource on the creation activity
Decrease material transaction costs
Increase the value of content
Increase the quality of programmes.

Modifications

Although the foregoing description describes the embodiments of the invention in relation to video material, the invention may be applied to audio material and/or to data material.

The foregoing description assumes that UMIDs are generated by the cameras and A-Boxes and are present in the tapes reproduced by the VTRs. However, UMIDs are long (e.g. 32 or 64 bytes). The tapes may not have UMIDs and the cameras may not produce UMIDs. Instead the cameras may produce shorter identifiers and such shorter identifiers may be recorded on the tapes. The B-Boxes of the VTRs may be used to generate UMIDs from the shorter identifiers and from Tape IDs. The A-boxes may generate UMIDs from the shot identifiers.

Figure 22:
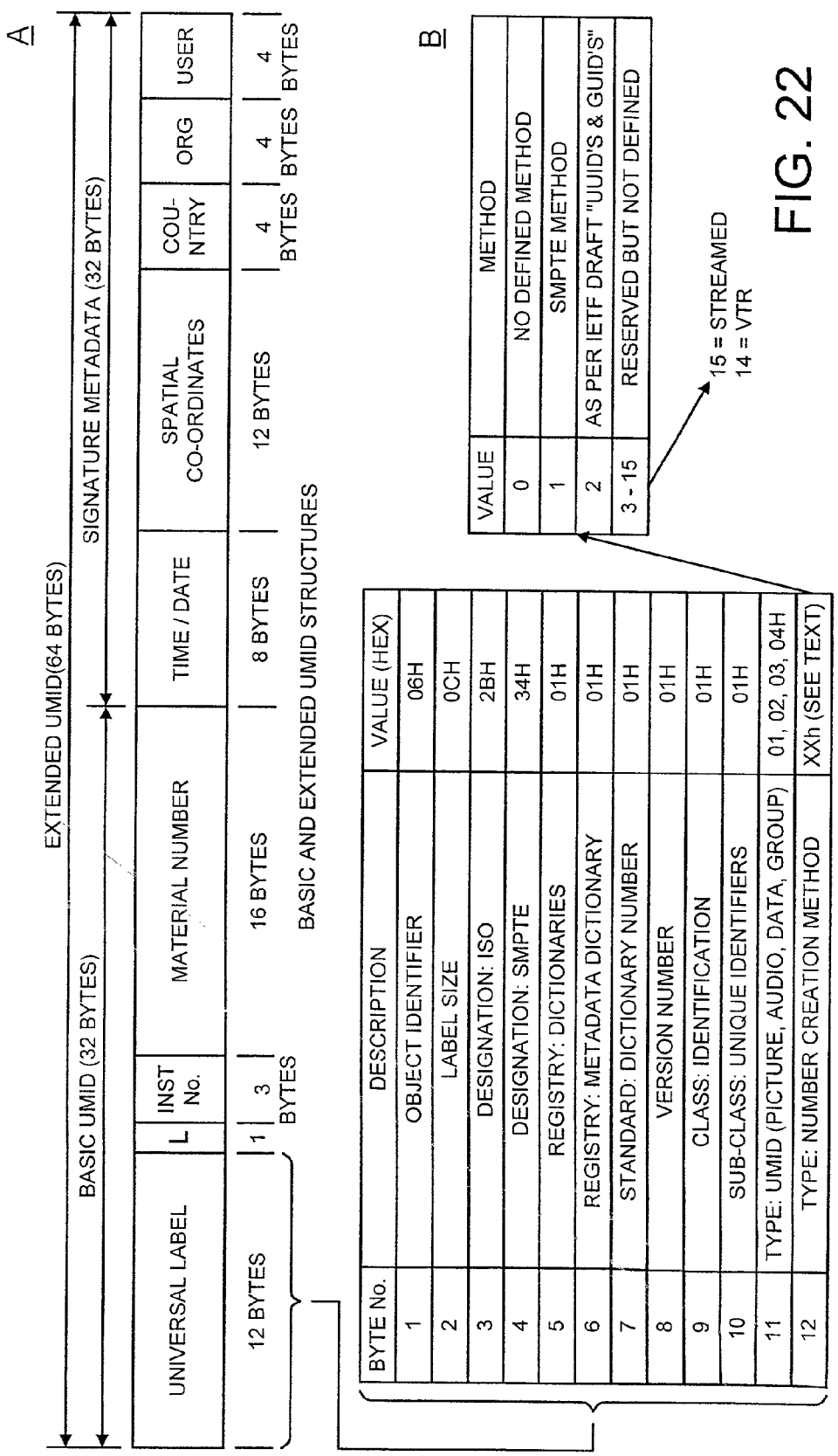
FIG. 22 is a schematic diagram of a UMID modified in accordance with another aspect of the invention.
Figure 23:
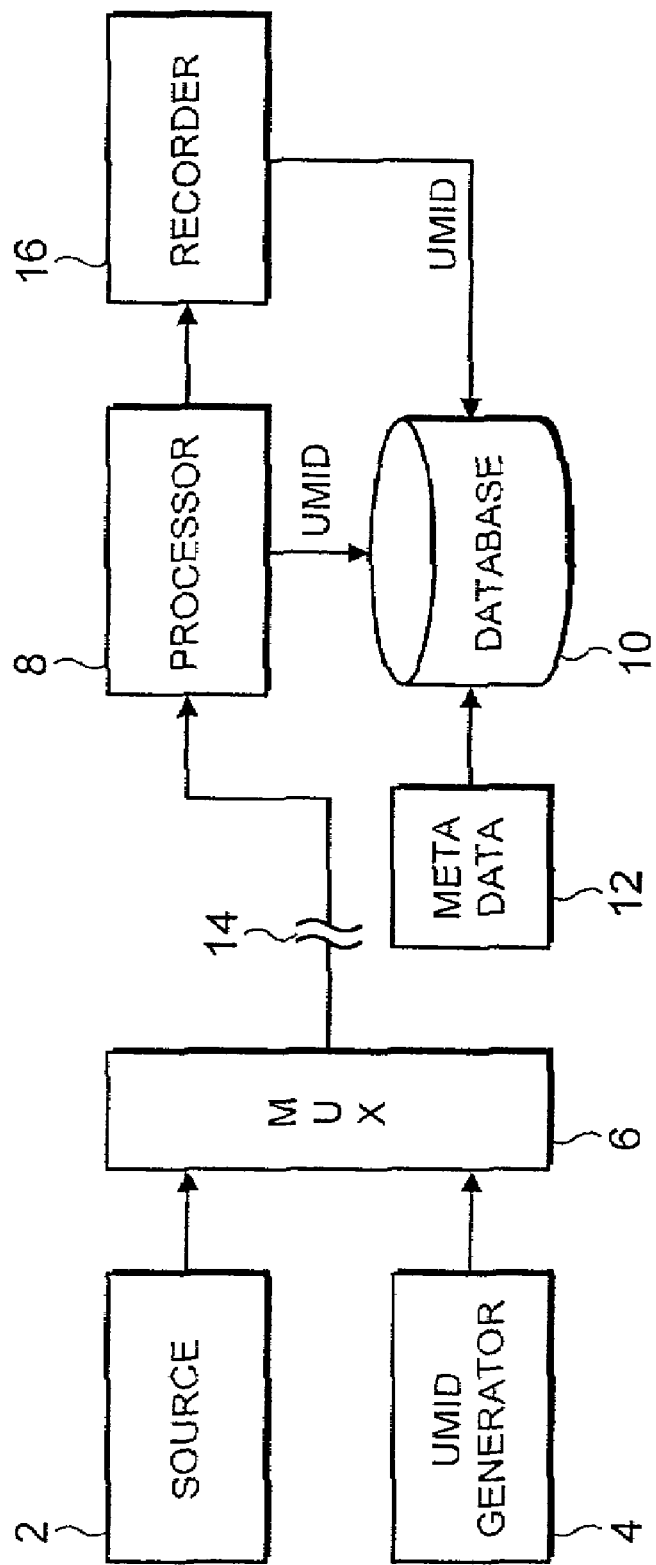
FIG. 23 is a schematic block diagram of a system which uses the UMID of FIG. 22.

Modified UMID—FIGS. 22 and 23

It will be appreciated that in the foregoing aspect of the invention, material is generated from a live source, e.g. camera or microtape and is recorded. The live material has a UMID associated with it. When recorded without modification, the material has the same UMID. However, it is desirable to identify live and recorded versions of the same material, or more generally the type of source of the material.

In accordance with an embodiment of this aspect of the present invention, the UMID of FIG. 22A (see also FIG. 3 and its description) is modified as shown in FIG. 22B. The Instance number field contains a number defined by byte 12 of the universal label. That byte has unassigned values 3 to 15.

One of those values is assigned to indicate that the instance number relates to streamed (live) rather than recorded material. In the preferred embodiment of FIG. 22B, the value 15 is chosen for streamed material.

Another of those values is assigned to indicate that the instance number relates to recorded rather than streamed material. In the preferred embodiment the value 14 is chosen for recorded material.

Referring to FIG. 23, a source 2, which may be a camera and/or microphone of original unrecorded video and/or audio material, produces for example analogue data. For simplicity assume the source is a camera producing only video. A UMID generator 4 generates a UMID with instance number 0 and type indicator 15 denoting unrecorded material. The UMID is embedded in the vertical blanking interval of the video by a multiplexer 6. The video is emitted to a processing chain 14, 8 having at least one processor 8. The processor 8 changes the form of the video, e.g. from analogue to digital in a way that does not change the content. Thus the material number of the UMID does not change but the instance number does. If the material is processed in a way that fails to change the instance number then the instance number may become false.

The processing chain may include a recorder 16. The recorder records the material and allocates a recorded material instance number to the material with type code 14 and the appropriate instance number, the material number being unchanged.

UMIDs generated at the source, the processor 8 and/or the recorder 16 may be communicated to a metadata base 10 where metadata generated e.g. by data entry means 12 is associated with the UMIDs. Examples of metadata are given in the section Metadata and FIG. 5 above.

Whilst the embodiments described above each include explicitly recited combinations of features according to different aspects of the present invention, other embodiments are envisaged according to the general teaching of the invention, which include combinations of features as appropriate, other than those explicitly recited in the embodiments described above. Accordingly, it will be appreciated that different combinations of features of the appended independent and dependent claims form further aspects of the invention other than those, which are explicitly recited in the claims.

Tables 1 to 5 Follow

TABLE 1

Single Input Transactions

| | Configuration | Variations | Policy | Comments |
|---|---|---|---|---|
| 1 | Camcorder | | New B | |
| 2 | VTR → VTR | • A/V only | New B | |
| | Full or partial copy | • A/V + UMID | New I # | |
| 3 | Camera → VTR + mic. | • A/V only<br>• A/V + UMID (stream) | Create B<br>New B+OS | B Box/VTR assigned original UMID stored as metadata |
| 4 | Camera → Switcher + mic. + mixer | • A/V only<br>• A/V + UMID (stream) | Create B<br>New B+OS | B/C Box assigned original UMID passed as metadata |

New B = new basic (32 byte UMID) i.e. new material #, instance # = 0
+OS = original signature (32 byte UMID extension)
New M # = new material number
New I # = new instance number
New L = change to byte 11/12 of UMID label

TABLE 2

Single Input (Processing) Transactions

| | Configuration | Variations | Policy | Comments |
|---|---|---|---|---|
| 5 | VTR → Proc → (Stream)<br>Digitally transparent or lossless | • Digital DA<br>• Router<br>• TX Line<br>• RF Link (Digital uncompressed)<br>• Digital Delay | Original B | In most cases UMIDs embedded in VBI should pass straight through. |
| 6 | VTR → Proc → VTR<br>Digitally transparent or lossless | • Digital DA<br>• Router<br>• TX Line<br>• RF Link (Digital uncompressed)<br>• Lossless compression | New I # | B Box assigned assuming original UMID is available. Proc delay must be compensated. |
| 7 | VTR → Proc → VTR<br>Non-transparent fixed process (no editorial or creative process) | • Noise reducer<br>• Colour correct/proc amp<br>• Standards convertor<br>• Letter box format conv.<br>• Lossy compression CODEC | New I # | B Box assigned assuming original UMID is Proc delay must be compensated. |
| 8 | VTR → Proc → VTR | • Colour grading<br>• Format pan &Scan<br>• DS Keyer | New B+OS | Keyer is basically 2 input though text or logos may not have UMIDs |

TABLE 3

Multiple Input Transactions

| | Configuration | Variations | Policy | Comments |
|---|---|---|---|---|
| 1 | Single machine V/O insert/overdub/mix | • Existing V<br>• Existing A<br>• New A | Original B<br>Original B<br>New B | Needs space for at least 2 UMIDs - not suitable for time-code user bits. |
| 2 | 2 Machine edit (assemble cuts only, audio follow | | New I # | User option to assign new B for assemble edit session |
| 3 | 2 Machine edit V/O, A or V insert | • Existing V<br>• Existing A<br>• New A/V | Original B<br>Original B<br>New B | |

TABLE 3-continued

Multiple Input Transactions

| | Configuration | Variations | Policy | Comments |
|---|---|---|---|---|
| 4 | 3 Machine edit cuts only, assemble &insert A/V | | New B | User options to assign (a) new M # for edit session or (b) pass original M # with new I # |
| 5 | 3 Machine edit cuts &FX, assemble &insert A/V | | New B | User options to assign (a) new M # for edit session or (b) pass original M # with new I # |
| 6 | A'-A' & A'-B' Roll NLE cuts &effects, assemble & insert A/V | | New B | User options to assign (a) new M # for edit session or (b) pass original M # with new I # Conform to air requires UMID &history to be rendered at the same time as FX |

TABLE 4

Multiple Output Transactions

| | Configuration | Variations | Policy | Comments |
|---|---|---|---|---|
| 1 | Dual VTR outputs • SD 4:3 • UD 16:9 | | Same M # Different M # | |
| 2 | Live Presentation • Vision TX • Radio TX • Auditorium | | Same UPID # Different M # | |

TABLE 5

Illustration of Metadata Creation and Use

| | Pre-Production | Production | | |
|---|---|---|---|---|
| Metadata | Plan and Commission | Editorial Planning and Scripting | Acquisition | Content Creation |
| Viewing Statistics | Used (Planning) | | | |
| Scripts | | Create | Used (Locations) | Used (Edits) |
| Editorial Brief | | Create | Used (plan) | Used (edits) |
| Tape ID | | | Create | Create |
| Material ID (UMID) | | | Create | Create/Used (ID) |
| Material Name | | | Create/Used (Handle) | Create/Used (Handle) |
| Shooting Location | | | Create | Used (Navigation) |
| Shooting Time | | | Create | Used (Navigation) |
| Good Shot Markers | | | Create | Used (Navigation) |
| Annotation of Content | | | Create | Used (Edits) |
| Composition | | | | Create |
| Video Copyright | | | Create | Create and Used |
| People/Roles | | Create | Used (Assignment) | Used (Assignment) |
| Delivery - Systems Layer | | | | |
| Encode B/W | | | | |
| Pan/Scan | | | | Create (Possibly) |
| EPG | | | | |
| TX Schedule | Create | | | |
| Contracts | | | | |

TABLE 5-continued

| | |
|---|---|
| Production | Create |
| Person/Stars | Create |
| Sale/Transmission | |
| Consumer Subscriptions | Used (Planning) |
| Catalogue Annotation | |

| | Production Stage | | | |
|---|---|---|---|---|
| | Sale and Transmission | | | Archival |
| Metadata | Sale | Packaging | Delivery | Payments | Catalogue/ Research |
| | Completed Material (Product) | | | |
| Viewing Statistics | | Create | | |
| Scripts | | Used (Enhanced TV) | | | Used (Search) |
| Editiorial Brief | | | | |
| Tape ID | | Used (ID) | Used (ID) | | |
| Material ID (UMID) | | Used (ID) | Used (ID) | Used (ID) | Used (ID) |
| Material Name | | Used (Handle) | Used (Handle) | Used (Handle) | Used (Handle) |
| Shooting Location | | | | | Used (Search) |
| Shooting Time | | | | | Used (Search) |
| Good Shot Markers | | | | | |
| Annotation of Content | | | | | Used (Search) |
| Composition | | Used (DVB-SI and ETV) | | | |
| Video Copyright | | Used (Encryption) | Used (Clearance) | Used (Royalty) | Used (Search) |
| People/Roles | | Used (Make EPG/ETV) | | Used (Royalty) | Used (Search) |
| Delivery - Systems Layer | | | | | |
| Encode B/W | | Create | Used | | |
| Pan/Scan | | Create (Possibly) | Used | | |
| EPG | | Create | Used | | |
| TX Schedule | | Create or Modify | Used (automation) | | Used (Search) |
| Contracts | | | | | |
| Production | | | | Used (Royalty) | |
| Person/Stars | | | | Used (Royalty) | |
| Sale/Transmission | Create | | Used (Check) | Used (Value) | |
| Consumer Subscriptions | | | | Used (PPV) | |
| Catalogue Annotation | | | | | Create/Used (Search) |

The invention claimed is:

1. A processing system comprising:

a video and/or audio material processing device, the material processing device having plurality of inputs configured to receive respective pieces of material to be processed, the pieces having respective identifiers, an output configured to output the processed material, which is a combination of the input material, and a state output configured to output data defining a state of the material processing device; and a processing unit configured to process identifiers of video and/or audio material, the processing unit detecting the identifiers of the input material, determining from the state data received from the material processing device, the combination of the input material forming the output material, generating an identifier for the output material and associating the identifier of the output material with the identifiers of the input materials determined to be used to form the output material, wherein the identifier of the output material is stored in a database in association with the identifiers of the input materials based on the association, all identifiers are removed from the output material prior to distribution over a network.

2. The system according to claim 1 further comprising:
a material recorder for recording the output material on a recording medium.

3. The system according to claim 2, wherein the processor is configured to associate the identifier of the output material and the identifiers of the input materials, used to form the output material, with the recording medium on which the output material is recorded.

4. The system according to claim 3, wherein, at least, the identifier of the output material is recorded on the medium.

5. The system according to claim 1, further comprising:
means for deriving the identifiers from the input material.

6. The system according to claim 1, wherein the processor further comprises the video and/or audio material processing device.

7. A processor for processing video anchor audio material, the processor comprising:
a plurality of inputs for receiving respective pieces of material to be processed, the pieces having respective identifiers;
an output configured to output processed material, which is a combination of the input material;
a detecting unit configured to detect the identifiers of the input material;
a determination unit configured to determine, from a state data, the combination of the input material forming the output material;
a generation unit configured to generate an identifier for the output material; and
an association unit configured to associate the identifier of the output material with the identifiers of the input materials determined to be used to form the output material by the determination unit,
wherein the identifier of the output material is stored in a database in association with the identifiers of the input materials based on the association made by the association units all identifiers are removed from the output material prior to distribution over a network.

8. A processor comprising:
a processing unit configured to process identifiers of video and/or audio material, the processor used with a video and/or audio material processing device, the device having plurality of inputs for receiving respective pieces of material to be processed, the pieces having respective identifiers, and an output configured to output processed material, which is a combination of the input material, the processing unit further comprising:
a first determination unit configured to determine the combination material forming the output material;
a second determination unit configured to determine the identifiers of the pieces of material;
a generation unit configured to generate an identifier for the output material; and
an association unit configured to associate the identifier of the output material with the identifiers of the pieces of material determined to be used to form the output material by the first determination unit,
wherein the identifier of the output material is stored in a database in association with the identifiers of the input materials based on the association made by the association unit, all identifiers are removed from the output material prior to distribution over a network.

9. A processor configured to process video and/or audio material, comprising:
a plurality of inputs for receiving respective pieces of material to be processed, the pieces having respective identifiers;
an output at which is output processed material, which is a combination of the input material;
a first determination unit configured to determine the combination material forming the output material;
a first determination unit configured to determine the identifiers of the pieces of material;
a generation unit configured to generate an identifier for the output material; and
an association unit configured to associate the identifier of the output material with the identifiers of the pieces of material determined to be used to form the output material by the first determination unit,
wherein the identifier of the output material is stored in a database in association with the identifiers of the input materials based on the association made by the association unit, all identifiers are removed from the output material prior to distribution over a network.

10. A method of processing identifiers of video and/or audio material, comprising:
processing the material using a video and/or audio material processing device, the device having a plurality of inputs for receiving respective pieces of material to be processed, the pieces having respective identifiers, an output configured to output processed material, which is a combination of the input material, and a state output at which data defining the state of the device is output,
detecting the identifiers of the input material;
determining, from the state data received from the material processing device, the combination of the input material forming the output material;
generating an identifier for the output material; and
associating the identifier of the output material with the identifiers of the input materials determined to be used to form the output material by the determining step,
wherein the identifier of the output material is stored in a database in association with the identifiers of the input materials based on the association made in the associating step, all identifiers are removed from the output material prior to distribution over a network.

11. A method of processing identifiers of video and/or audio material, comprising:
processing the material using a video and/or audio material processing device, the device having plurality of inputs for receiving respective pieces of material to be processed, the pieces having respective identifiers, and an output at which is output processed material, which is a combination of the input material;
determining the combination material forming the output material;
determining the identifiers of the pieces of material;
generating an identifier for the output material; and
associating the identifier of the output material with the identifiers of the pieces of material determined to be used to form the output material by the determining the combination material step,
wherein the identifier of the output material is stored in a database in association with the identifiers of the input materials based on the association made in the associating step, all identifiers are removed from the output material prior to distribution over a network.

12. A computer readable storage medium storing a computer program code mechanism which when executed by a processor, causes the processor to perform a method of processing identifiers of video and/or audio material, comprising:
processing video and/or audio material using a video and/or audio material processing device, the device having a plurality of inputs for receiving respective pieces of material to be processed, the pieces having respective identifiers, an output configured to output processed material, which is a combination of the input material, and a state output at which data defining the state of the device is output, detecting the identifiers of the input material;

determining, from the state data received from the material processing device, the combination of the input material forming the output material;

generating an identifier for the output material; and associating the identifier of the output material with the identifiers of the input materials determined to be used to form the output material by the determining step, wherein the identifier of the output material is stored in a database in association with the identifiers of the input materials based on the association made in the associating step, all identifiers are removed from the output material prior to distribution over a network.

13. A computer readable storage medium storing a computer program code mechanism which when executed by a processor, causes the processor to perform a method of processing identifiers of video and/or audio material, comprising:

processing the material using a video and/or audio material processing device, the device having plurality of inputs for receiving respective pieces of material to be processed, the pieces having respective identifiers, and an output at which is output processed material, which is a combination of the input material;

determining the combination material forming the output material;

determining the identifiers of the pieces of material;

generating an identifier for the output material; and associating the identifier of the output material with the identifiers of the pieces of material determined to be used to form the output material by the determining the combination material step, wherein the identifier of the output material is stored in a database in association with the identifiers of the input materials based on the association made in the associating step, all identifiers are removed from the output material prior to distribution over a network.

* * * * *